United States Patent
Lee et al.

(10) Patent No.: US 9,025,620 B2
(45) Date of Patent: May 5, 2015

(54) METHOD AND APPARATUS FOR TRANSMITTING SIGNAL IN WIRELESS COMMUNICATION SYSTEM

(75) Inventors: Moon Il Lee, Anyang-si (KR); Wook Bong Lee, Anyang-si (KR); Ja Ho Koo, Anyang-si (KR); Hyun Soo Ko, Anyang-si (KR); Jae Hoon Chung, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 366 days.

(21) Appl. No.: 13/256,432

(22) PCT Filed: Mar. 30, 2010

(86) PCT No.: PCT/KR2010/001907
§ 371 (c)(1),
(2), (4) Date: Sep. 13, 2011

(87) PCT Pub. No.: WO2010/114269
PCT Pub. Date: Oct. 7, 2010

(65) Prior Publication Data
US 2012/0008587 A1    Jan. 12, 2012

Related U.S. Application Data

(60) Provisional application No. 61/164,885, filed on Mar. 30, 2009.

(30) Foreign Application Priority Data

Mar. 18, 2010    (KR) .................... 10-2010-0024043

(51) Int. Cl.
*H04J 3/16*    (2006.01)
*H04J 11/00*    (2006.01)
(Continued)

(52) U.S. Cl.
CPC ............ *H04L 1/0041* (2013.01); *H04L 1/0075* (2013.01); *H04L 1/06* (2013.01)

(58) Field of Classification Search
CPC ....... H04J 11/00; H04J 3/1682; H04W 72/04; H04L 5/0007; H04L 5/0053; H04L 1/0026; H04B 7/0639; H04B 7/0632
USPC ......... 370/468, 329, 328, 330, 203–210, 344, 370/480, 482; 455/115, 133, 134, 135, 455/114.3; 375/299, 260, 296, 220, 267
See application file for complete search history.

(56) References Cited

U.S. PATENT DOCUMENTS 8,301,155 B2 * 10/2012 Ho et al. .................... 455/452.2
8,315,223 B2 * 11/2012 Tsutsui ........................ 370/330
(Continued)

FOREIGN PATENT DOCUMENTS

CN    101272170 A    9/2008
CN    101273548 A    9/2008
(Continued)

OTHER PUBLICATIONS

The State Intellectual Property Office of the People's Republic of China Application Serial No. 201080014990.4, Office Action dated Sep. 5, 2013, 5 pages.
(Continued)

*Primary Examiner* — Hanh N Nguyen
(74) *Attorney, Agent, or Firm* — Lee, Hong, Degerman, Kang & Waimey

(57) ABSTRACT

A method and apparatus for transmitting a signal in a wireless communication system are provided. The method includes: generating R spatial streams each of which is generated on the basis of an information stream and a reference signal; generating N transmit streams on the basis of the R spatial streams and a precoding matrix (where R<N); mapping the N transmit streams to at least one resource block; and generating N signals from the N transmit streams mapped to the at least one resource block, and transmitting the N signals to a user equipment through respective antennas.

6 Claims, 20 Drawing Sheets

(51) Int. Cl.
*H04W 4/00* (2009.01)
*H04L 1/00* (2006.01)
*H04L 1/06* (2006.01)

(56) References Cited

U.S. PATENT DOCUMENTS

| | | | | |
|---|---|---|---|---|
| 8,315,324 | B2* | 11/2012 | Lee et al. | 375/267 |
| 8,351,530 | B2* | 1/2013 | Pan et al. | 375/267 |
| 8,451,915 | B2* | 5/2013 | Khan et al. | 375/260 |
| 8,477,863 | B2* | 7/2013 | Pan et al. | 375/267 |
| 8,559,297 | B2* | 10/2013 | Kawamura et al. | 370/210 |
| 2008/0232492 | A1* | 9/2008 | Xiao et al. | 375/260 |
| 2010/0042887 | A1* | 2/2010 | Yamada et al. | 714/749 |
| 2010/0111226 | A1* | 5/2010 | Ko et al. | 375/299 |

FOREIGN PATENT DOCUMENTS

| | | |
|---|---|---|
| CN | 101282564 A | 10/2008 |
| CN | 101325442 A | 12/2008 |
| KR | 1020080083808 | 9/2008 |
| KR | 1020080091398 | 10/2008 |
| KR | 1020080094056 | 10/2008 |
| KR | 1020080094935 | 10/2008 |
| WO | 2008009157 | 1/2008 |
| WO | 2009022820 | 2/2009 |

OTHER PUBLICATIONS

Huawei, "DL control signaling to support MIMO", R1-073511, TSG RAN WG1 meeting #50, Aug. 2007, 5 pages.

NTT Docomo, et al., "Investigation on Frequency Granularity of SU-MIMO Precoding in E-Utra Downlin", R1-073707, 3GPP TSG RAN WG1 Meeting #50, Aug. 2007, 7 pages.

NTT Docomo, et al., "Investigation on Control Information Bits in PDCCH", R1-073697, 3GPP TSG RAN WG1 Meeting #50, Aug. 2007, 27 pages.

Japan Patent Office Application Serial No. 2012-503315, Office Action dated Apr. 1, 2013, 3 pages.

Editor (Motorola), "Draft Change Request 36.213 CR CRNum Rev. Current version: 8.1.0," 3GPP TSG-RAN WG1 Meeting #52, R1-080717, Feb. 2008, 18 pages.

AH Chairman, "Summary of AH session on AI 6.4.5 'UE Procedures for downlink shared channel'," 3GPP TSG RAN WG1 Meeting #51, R1-075069, Nov. 2007, 7 pages.

Japan Patent Office Application Serial No. 2012-503315, Office Action dated Dec. 25, 2013, 3 pages.

* cited by examiner

Antenna #5

METHOD AND APPARATUS FOR TRANSMITTING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2010/001907, filed on Mar. 30, 2010, which claims the benefit of earlier filing date and right of priority to Korean Application No. 10-2010-0024043, filed on Mar. 18, 2010, and also claims the benefit of U.S. Provisional Application Ser. No. 61/164,885, filed on Mar. 30, 2009, the contents of which are all incorporated by reference herein in their entirety.

TECHNICAL FIELD

The present invention relates to wireless communications, and more particularly, to a method and apparatus for transmitting a signal in a wireless communication system.

BACKGROUND ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

A multiple input multiple output (MIMO) scheme is used as a technique for supporting a reliable high-speed data service. The MIMO scheme uses multiple transmit antennas and multiple receive antennas to improve data transmission/reception efficiency. Examples of the MIMO scheme include spatial multiplexing, transmit diversity, beamforming, etc.

A MIMO channel matrix is formed by multiple receive antennas and multiple transmit antennas. A rank can be obtained from the MIMO channel matrix. The rank is the number of spatial layers. The rank may also be defined as the number of spatial streams that can be simultaneously transmitted by a transmitter. The rank is also referred to as a spatial multiplexing rate. If the number of transmit antennas is Nt and the number of receive antennas is Nr, a rank R satisfies R≤min {Nt, Nr}.

A wireless communication system requires a signal known to both a transmitter and a receiver to perform channel measurement, information demodulation, or the like. The signal known to both the transmitter and the receiver is referred to as a reference signal (RS). The RS may also be referred to as a pilot.

The receiver may estimate a channel between the transmitter and the receiver by using the RS, and may demodulate information by using the estimated channel. When a user equipment receives an RS transmitted by a base station, the user equipment may measure a channel by using the RS, and may feed back channel state information to the base station.

A signal transmitted from the transmitter experiences a channel corresponding to each transmit antenna or each spatial layer, and thus the RS may be transmitted for each transmit antenna or each spatial layer. If the RS is transmitted for each spatial layer, the RS may be transmitted after precoding. In this case, the receiver needs to know information on a frequency region in which the same precoding matrix is used.

Accordingly, there is a need to provide a method and apparatus for effectively transmitting a signal in a wireless communication system.

SUMMARY OF INVENTION

Technical Problem

The present invention provides a method and apparatus for transmitting a signal in a wireless communication system.

Solution to Problem

According to one aspect of the present invention, a signal transmission method in a wireless communication system is provided. The method includes: generating R spatial streams each of which is generated on the basis of an information stream and a reference signal; generating N transmit streams on the basis of the R spatial streams and a precoding matrix (where R<N); mapping the N transmit streams to at least one resource block; and generating N signals from the N transmit streams mapped to the at least one resource block, and transmitting the N signals to a user equipment through respective antennas.

According to another aspect of the present invention, a signal transmission apparatus in a wireless communication system is provided. The apparatus includes: N antennas; and a processor coupled to the N antennas and configured for transmitting precoding bandwidth information indicating a bandwidth in which the same precoding matrix is used; generating R spatial streams each of which is generated on the basis of an information stream and a reference signal; generating N transmit streams on the basis of the R spatial streams and a precoding matrix; mapping the N transmit streams to at least one resource block; and generating N signals from the N transmit streams mapped to the at least one resource block, and transmitting the N signals to a user equipment through respective antennas.

Advantageous Effects of Invention

According to the present invention, a method and apparatus for effectively transmitting a signal in a wireless communication system are provided. Therefore, overall system performance can be improved.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

For clarity, the following description will focus on the LTE(Release 8)/LTE-A(Release 10). However, technical features of the present invention are not limited thereto.

Figure 1:
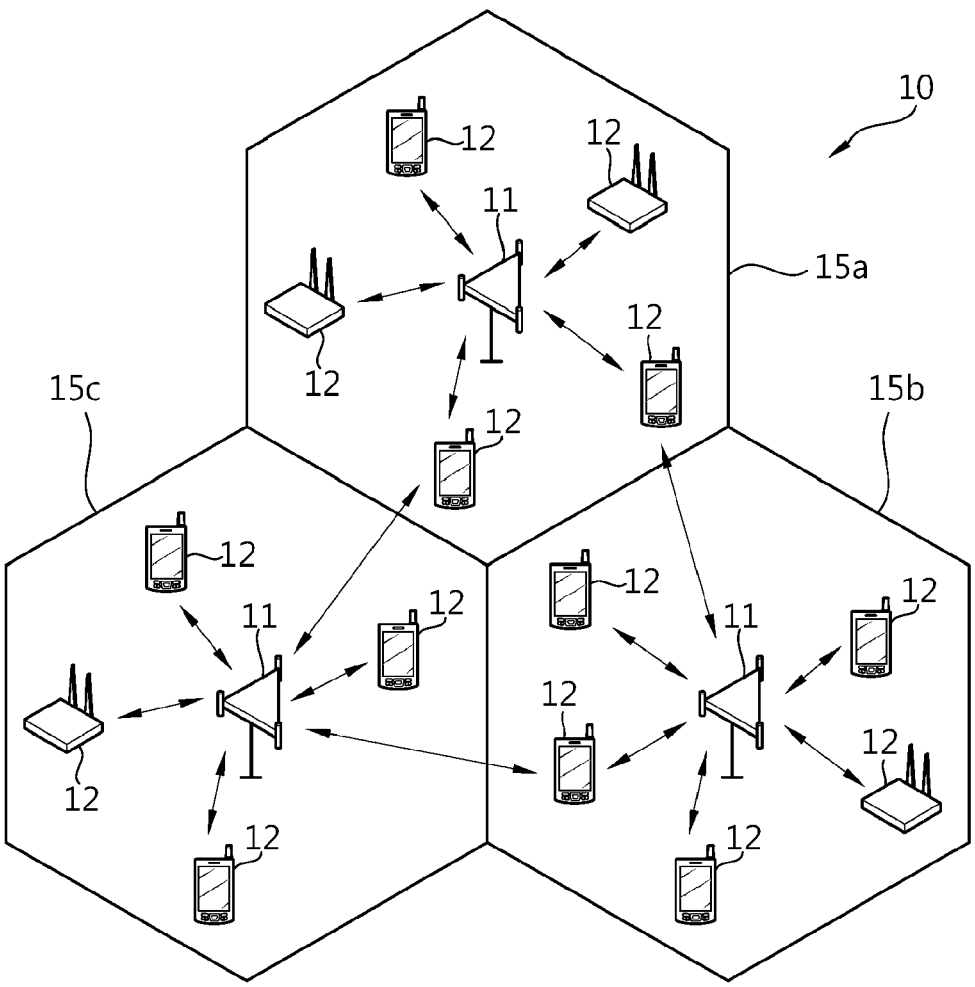
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15*a*, 15*b*, and 15*c*. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. The BS 11 is generally a fixed station that communicates with the UE 12 and may be referred to as another terminology, such as an evolved node-B (eNB), a base transceiver system (BTS), an access point, an access network (AN), etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

The wireless communication system can support multiple antennas. The transmitter may use a plurality of transmit antennas, and the receiver may use a plurality of receive antennas. The transmit antenna denotes a physical or logical antenna used for transmission of one signal or stream. The receive antenna denotes a physical or logical antenna used for reception of one signal or stream. When the transmitter and the receiver use a plurality of antennas, the wireless communication system may be referred to as a multiple input multiple output (MIMO) system.

A wireless communication process is preferably implemented with a plurality of independent hierarchical layers rather than one single layer. A structure of a plurality of hierarchical layers is referred to as a protocol stack. The protocol stack may refer to an open system interconnection (OSI) model which is a widely known protocol for communication systems.

Figure 2:
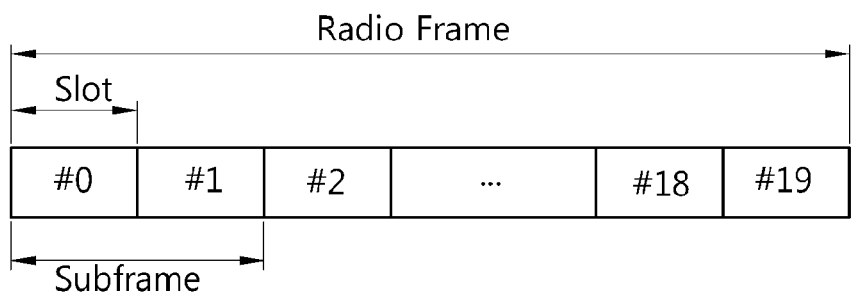
FIG. 2 shows an exemplary structure of a radio frame.

FIG. 2 shows an exemplary structure of a radio frame.

Referring to FIG. 2, the radio frame consists of 10 subframes, and one subframe consists of two slots. Slots included in the radio frame are indexed with slot numbers from #0 to #19. A time for transmitting one subframe is defined as a transmission time interval (TTI). The TTI may be regarded as a scheduling unit for information transmission. For example, one radio frame may have a length of 10 milliseconds (ms), one subframe may have a length of 1 ms, and one slot may have a length of 0.5 ms. The structure of the radio frame is for exemplary purposes only, and thus the number of subframes included in the radio frame or the number of slots included in the subframe may change variously.

Figure 3:
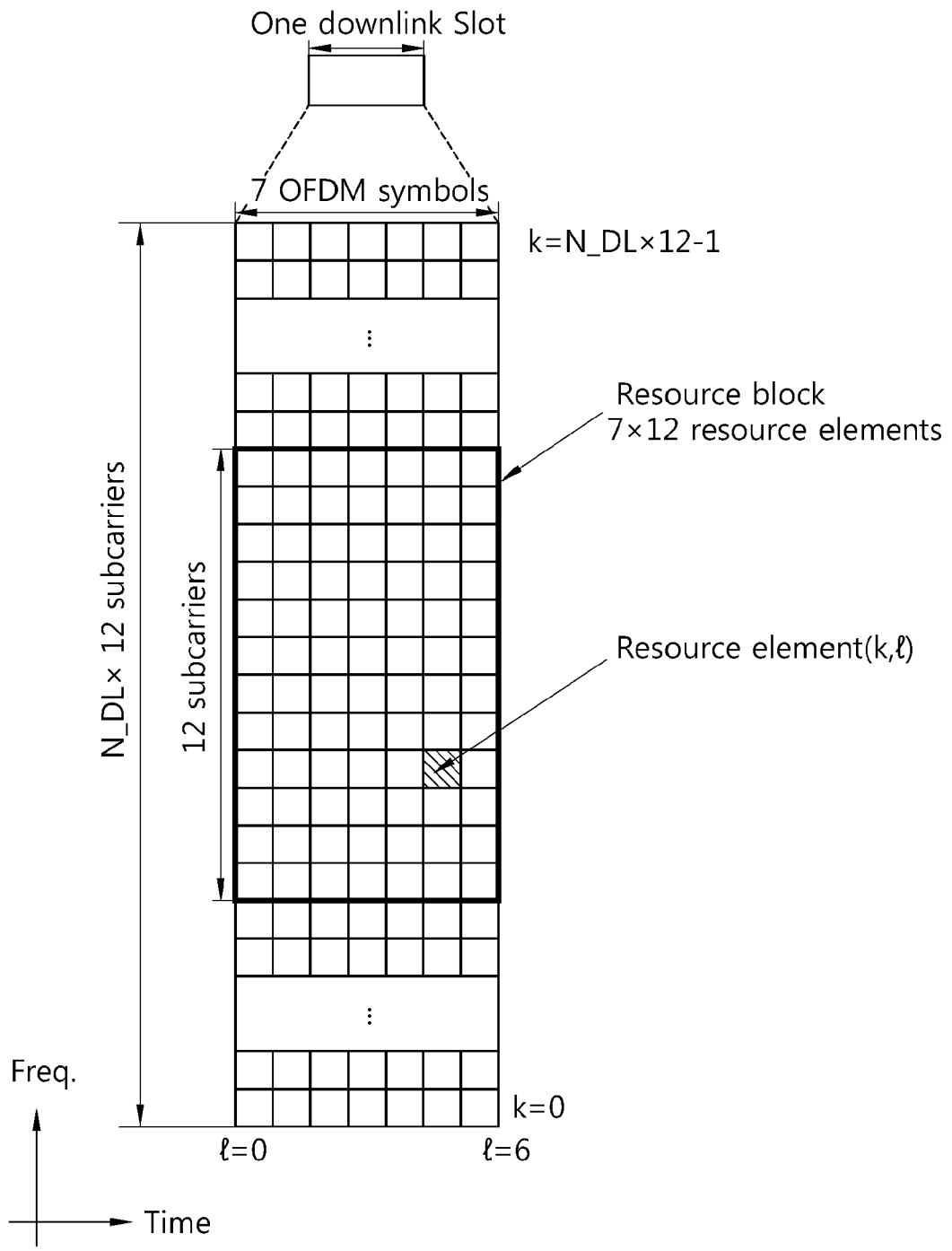
FIG. 3 shows an example of a resource grid for one downlink slot.

FIG. 3 shows an example of a resource grid for one DL slot.

Referring to FIG. 3, the DL slot includes a plurality of orthogonal frequency division multiplexing (OFDM) symbols in a time domain, and includes N_DL resource blocks (RBs) in a frequency domain. The OFDM symbol is for expressing one symbol period, and may also be referred to as another terminology, such as an OFDMA symbol, an SC-FDMA symbol, etc., according to a multiple access scheme. The number N_DL of RBs included in the DL slot depends on a downlink transmission bandwidth determined in a cell. In an LTE, the number N_DL may be any value in the range of 6 to 110. One RB includes a plurality of subcarriers in the frequency domain.

Each element on the resource grid is referred to as a resource element. The resource element on the resource grid can be identified by an index pair (k, l) in the slot. Herein, $k(k=0, \ldots, N^{DL} \times 12-1)$ denotes a subcarrier index in the frequency domain, and $l(l=0, \ldots, 6)$ denotes an OFDM symbol index in the time domain.

Although it is described herein that one RB includes 7(12 resource elements consisting of 7 OFDM symbols in the time domain and 12 subcarriers in the frequency domain for example, the number of OFDM symbols and the number of subcarriers included in the RB are not limited thereto. The number of OFDM symbols may variously change depending on a cyclic prefix (CP) length and a subcarrier spacing. For example, in case of a normal CP, the number of OFDM symbols is 7, and in case of an extended CP, the number of OFDM symbols is 6.

The resource grid for one DL slot of FIG. 3 can also apply to a resource grid for a UL slot.

Figure 4:
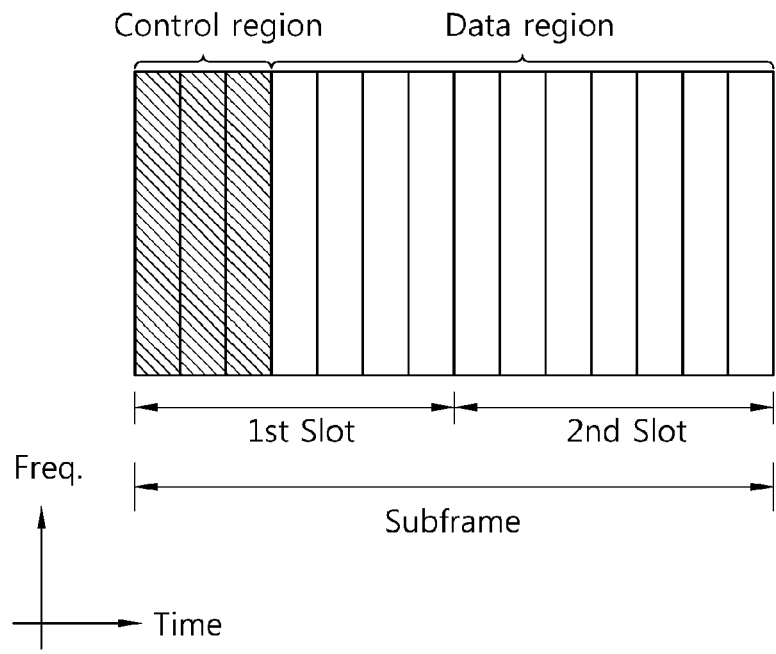
FIG. 4 shows an exemplary structure of a downlink subframe.

FIG. 4 shows an exemplary structure of a DL subframe.

Referring to FIG. 4, the DL subframe includes two consecutive slots. First 3 OFDM symbols of a $1^{st}$ slot included in the DL subframe correspond to a control region, and the remaining OFDM symbols correspond to a data region. Herein, the control region includes 3 OFDM symbols for exemplary purposes only.

A physical downlink shared channel (PDSCH) may be allocated to the data region. DL data is transmitted over the PDSCH.

A control channel may be allocated to the control region. Examples of the control channel include a physical control format indicator channel (PCFICH), a physical HARQ indicator channel (PHICH), a physical downlink control channel (PDCCH), etc.

The PCFICH carries information indicating the number of OFDM symbols used for transmission of PDCCHs in a subframe to a UE. The number of OFDM symbols used for PDCCH transmission may change in every subframe. The PHICH carries HARQ acknowledgement (ACK)/negative acknowledgement (NACK) for UL data.

The PDCCH carriers DL control information. Examples of the DL control information include DL scheduling information, UL scheduling information, or a UL power control command, etc. The DL scheduling information is also referred to as a DL grant. The UL scheduling information is also referred to as a UL grant.

The DL grant may include a resource allocation field indicating a time-frequency resource for transmitting DL data, a modulation and coding scheme (MCS) field indicating an MCS level of the DL data, etc.

If a transmission scheme is multiple user-MIMO (MU-MIMO), the DL grant may further include a power offset field. The power offset field indicates power offset information for obtaining downlink transmission energy for each resource element.

The transmission scheme is a scheme in which a BS transmits DL data to the UE. Examples of the transmission scheme include a single antenna scheme, a MIMO scheme, etc. The MIMO scheme includes a transmit diversity scheme, a closed-loop spatial multiplexing scheme, an open-loop spatial multiplexing scheme, a MU-MIMO system, etc. The transmission scheme may be semi-statically determined using higher layer signaling such as radio resource control (RRC) signaling.

A wireless communication system requires a signal known to both a transmitter and a receiver to perform channel measurement, information demodulation, or the like. The signal known to both the transmitter and the receiver is referred to as a reference signal (RS). The RS may also be referred to as a pilot. The RS does not carry information derived from a higher layer, and may be generated in a physical layer.

When the RS is transmitted, the RS may be multiplied by a pre-determined RS sequence. The RS sequence may be a binary sequence or a complex sequence. For example, the RS sequence may use a pseudo-random (PN) sequence, an m-sequence, etc. However, this is for exemplary purposes only, and thus there is no particular restriction on the RS sequence. When the BS transmits the RS by multiplying the RS by the RS sequence, the UE can reduce interference acting on the RS by a signal of a neighbor cell. Accordingly, channel estimation performance can be improved.

The RS can be classified into a common RS and a dedicated RS.

The common RS is an RS transmitted to all UEs in a cell. All UEs in the cell may receive the common RS. To avoid inter-cell interference, the common RS may be determined in a cell-specific manner. In this case, the common RS is referred to as a cell-specific RS. The common RS may be used in channel estimation and information demodulation. An example of an RS used only for channel measurement includes a channel state information-RS (CSI-RS).

The dedicated RS is an RS received by a specific UE group or a specific UE in a cell. The dedicated RS cannot be used by other UEs. The dedicated RS is also referred to as a UE-specific RS. The dedicated RS may be transmitted using a resource block allocated for DL data transmission of the specific UE. The dedicated RS may be used in information demodulation.

Figure 5:
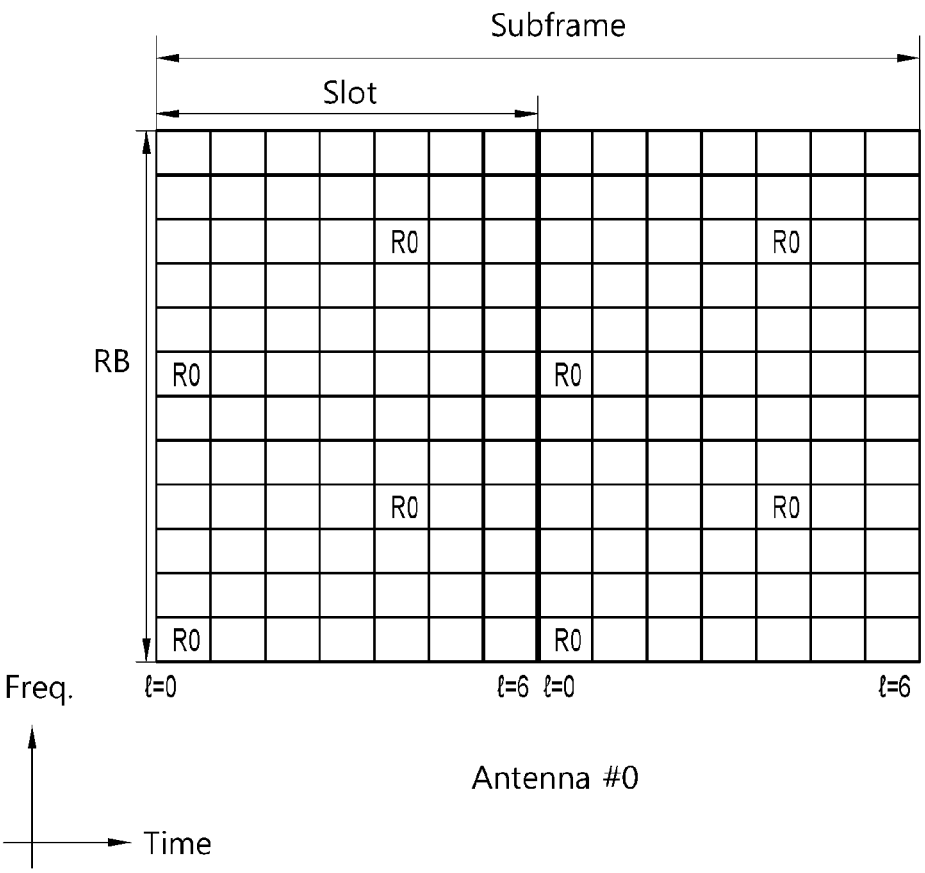
FIG. 5 shows exemplary mapping of a common reference signal (RS) for one antenna when using a normal cyclic prefix (CP).
Figure 6:
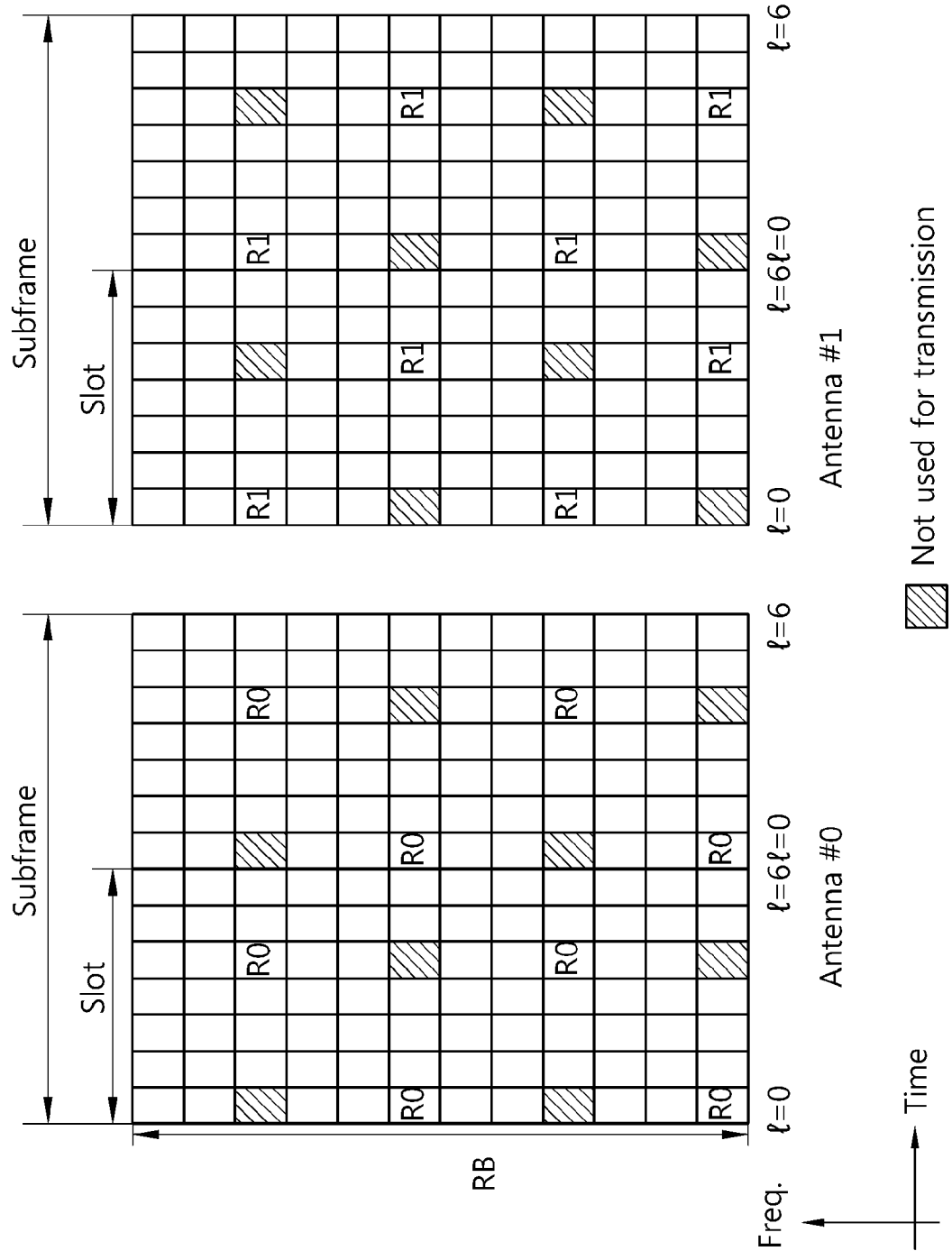
FIG. 6 shows exemplary mapping of common RSs for two antennas when using a normal CP.
Figure 7:
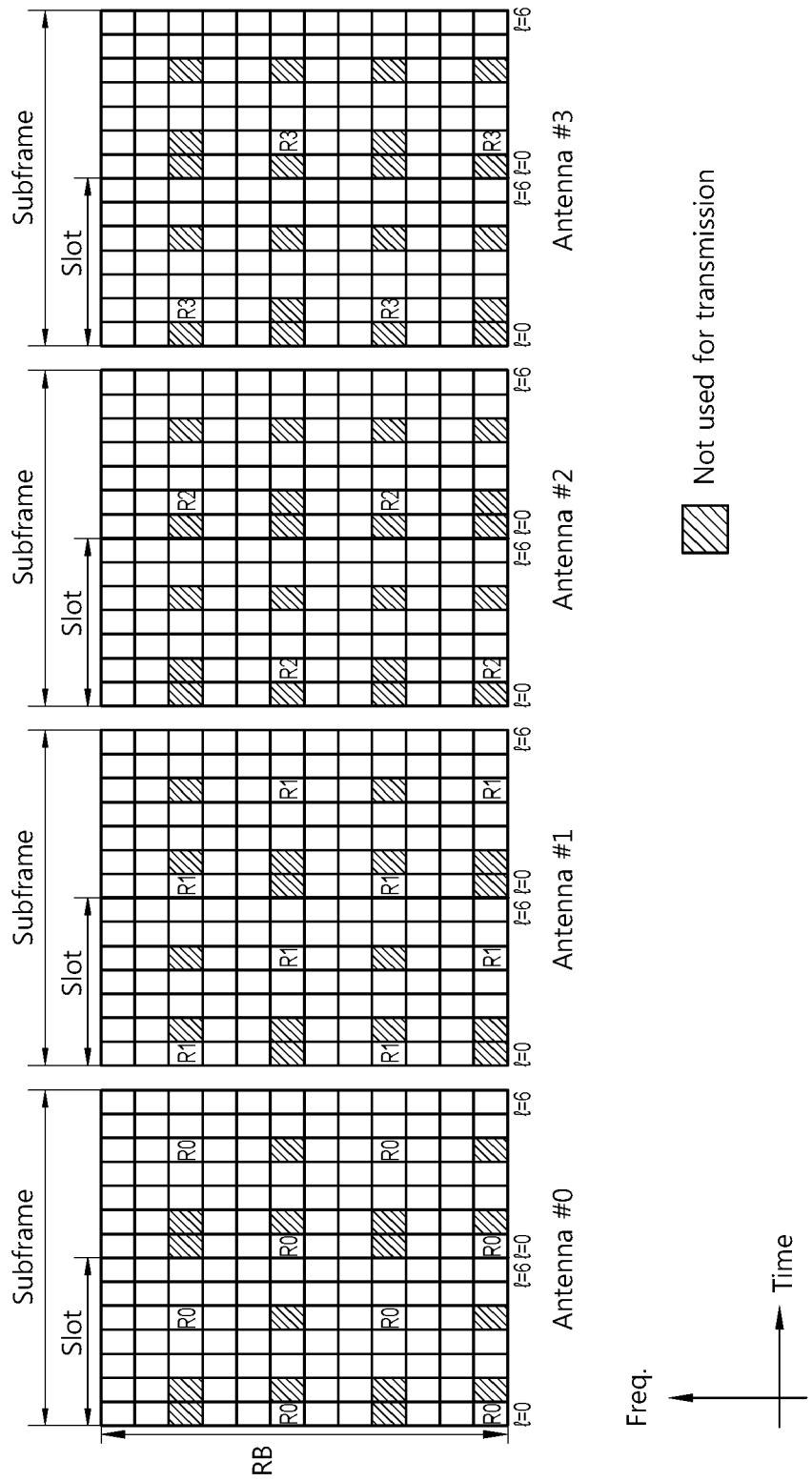
FIG. 7 shows exemplary mapping of common RSs for four antennas when using a normal CP.
Figure 8:
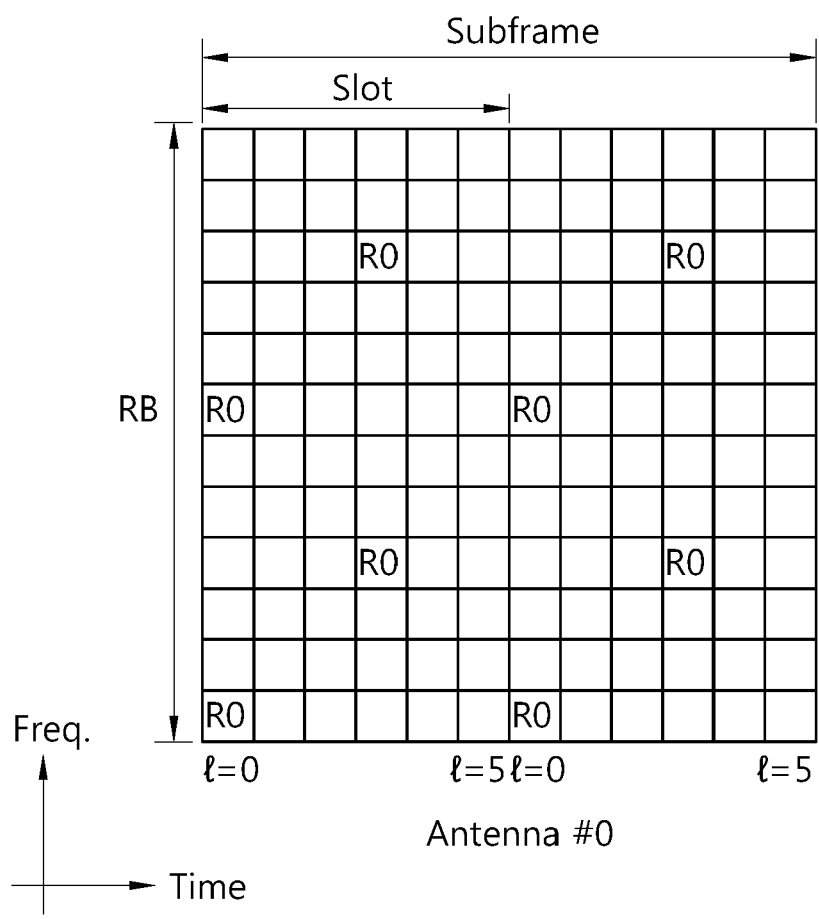
FIG. 8 shows exemplary mapping of a common RS for one antenna when using an extended CP.
Figure 9:
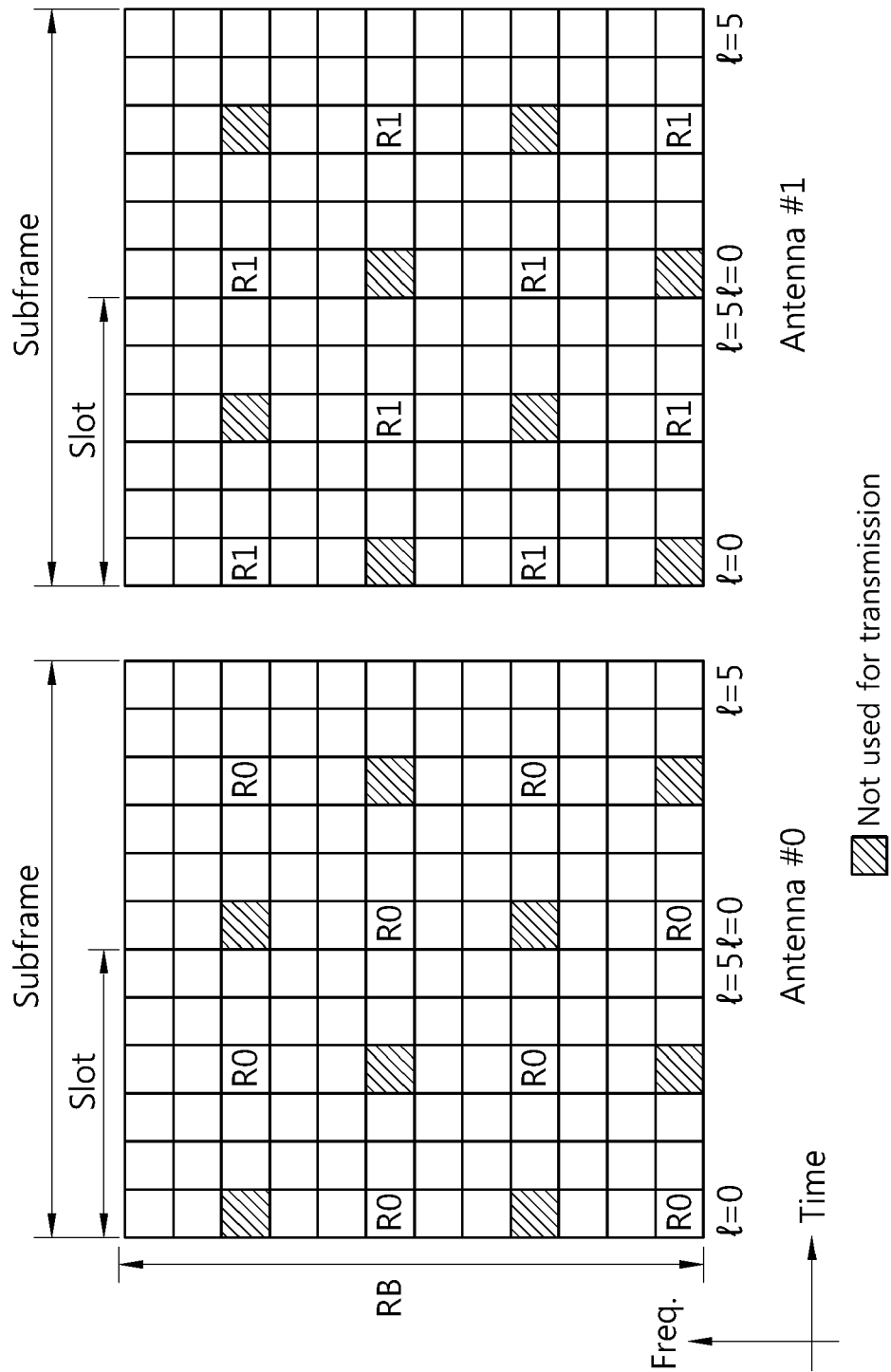
FIG. 9 shows exemplary mapping of common RSs for two antennas when using an extended CP.
Figure 10:
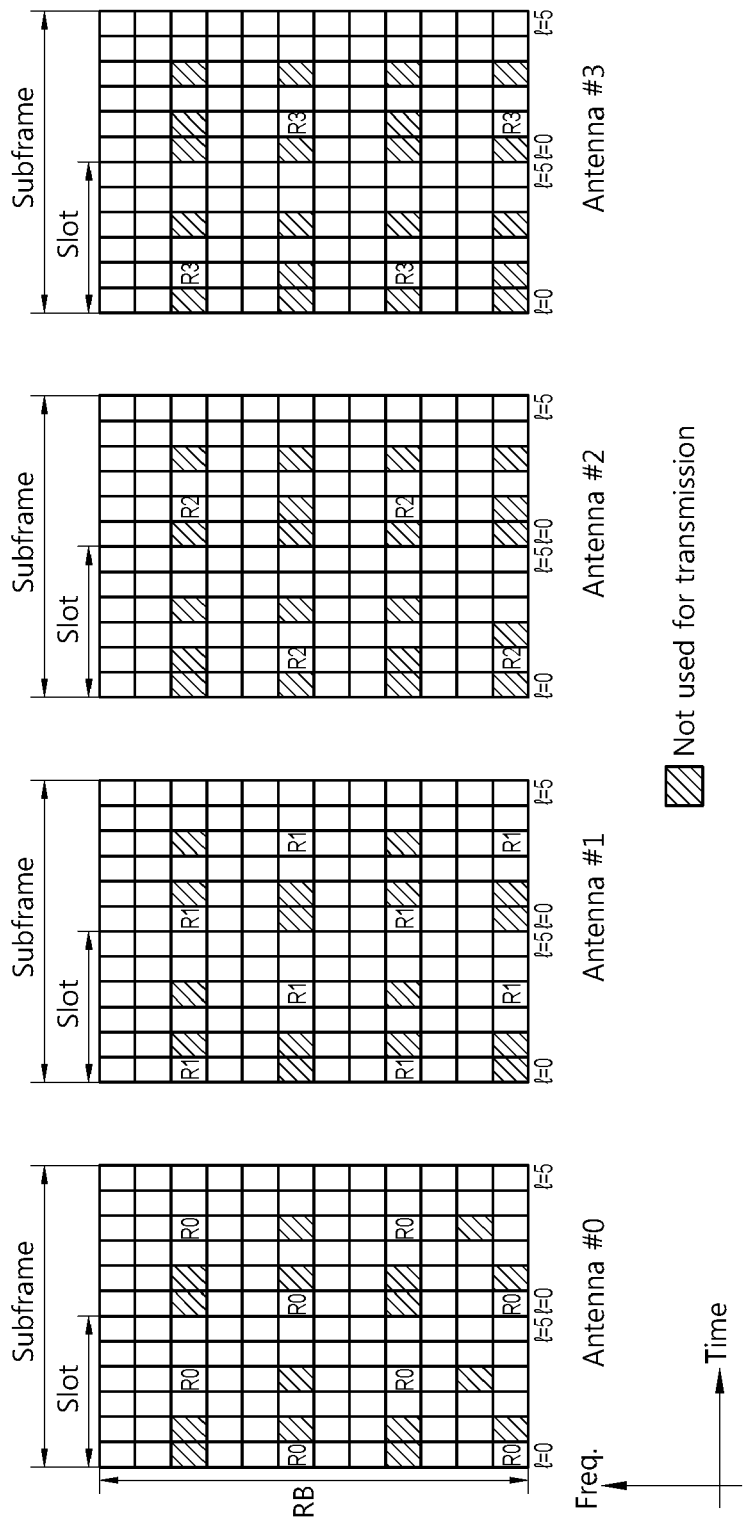
FIG. 10 shows exemplary mapping of common RSs for four antennas when using an extended CP.

FIG. 5 shows exemplary mapping of a common RS for one antenna when using a normal CP. FIG. 6 shows exemplary mapping of common RSs for two antennas when using a normal CP. FIG. 7 shows exemplary mapping of common RSs for four antennas when using a normal CP. FIG. 8 shows exemplary mapping of a common RS for one antenna when using an extended CP. FIG. 9 shows exemplary mapping of common RSs for two antennas when using an extended CP. FIG. 10 shows exemplary mapping of common RSs for four antennas when using an extended CP.

Referring to FIG. 5 to FIG. 10, Rp denotes a resource element used for RS transmission through an antenna #p (where p=0, 1, 2, 3). Hereinafter, the resource element used for RS transmission is referred to as a reference resource element. The resource element Rp is defined as a reference resource element for the antenna #p. The resource element Rp is used only for transmission through the antenna #p, and is not used for any other transmissions. In other words, a resource element used for RS transmission through a certain antenna in a subframe is not used for any other transmissions through other antennas in the same subframe, and may be set to '0'. This is to avoid interference between antennas.

For convenience of explanation, a minimum unit of an RS pattern in a time-frequency resource is hereinafter referred to as a basic unit. The RS pattern determines a location of a reference resource element in the time-frequency resource. If the basic unit is extended to a time domain and/or a frequency domain, the RS pattern is iterated. Herein, the basic unit is one subframe in the time domain and one resource block in the frequency domain.

A common RS may be transmitted in every DL subframe. One common RS is transmitted for each antenna. The common RS corresponds to a set of reference resource elements in a subframe. A BS may transmit the common RS by multiplying the common RS by a pre-defined common RS sequence.

An RS pattern of the common RS is referred to as a common RS pattern. Common RS patterns for the respective antennas are orthogonal to each other in the time-frequency domain. The common RS pattern is common to all UEs in a cell. The common RS sequence is also common to all UEs in the cell. However, to minimize inter-cell interference, each of the common RS pattern and the common RS sequence may be determined in a cell-specific manner.

The common RS sequence may be generated on an OFDM symbol basis in one subframe. The common RS sequence may differ according to a cell identifier (ID), a slot number in one radio frame, an OFDM symbol index in a slot, a CP length, etc.

In an OFDM symbol including a reference resource element in a basic unit, the number of reference resource elements for one antenna is 2. That is, in an OFDM symbol including the resource element Rp in the basic unit, the number of resource elements Rp is 2. A subframe includes N_DL resource blocks in the frequency domain. Therefore, in an OFDM symbol including the resource element Rp in the subframe, the number of resource elements Rp is 2(N_DL. Further, in the OFDM symbol including the resource element Rp in the subframe, a length of a common RS sequence for the antenna #p is 2(N_DL.

The following equation shows an example of a complex sequence r(m) generated for a common RS sequence in one OFDM symbol.

$$r(m) = \frac{1}{\sqrt{2}}(1 - 2 \cdot c(2m)) + j\frac{1}{\sqrt{2}}(1 - 2 \cdot c(2m + 1)), \quad \text{[Math. 1]}$$

$$m = 0, 1, \ldots, 2N\_max, DL - 1$$

Herein, N_max,DL denotes the number of resource blocks corresponding to a maximum downlink transmission bandwidth supported in the wireless communication system. In an LTE, N_max,DL is 110. If N_DL is less than N_max,DL, a certain part of a length of 2(N_DL may be used as a common RS sequence by being selected from a complex sequence generated in a length of 2(N_max,DL. c(i) denotes a PN sequence. The PN sequence can be defined by a gold sequence having a length of 31. The following equation shows an example of c(i).

$$c(n) = (x(Nc) + y(n+Nc)) \bmod 2$$

$$x(n+31) = (x(n+3) + x(n)) \bmod 2$$

$$y(n+31) = (y(n+3) + y(n+2) + x(n+1) + x(n)) \bmod 2 \quad \text{[Math. 2]}$$

Herein, Nc is 1600, x(i) is a first m-sequence, and y(i) is a second m-sequence. For example, the first m-sequence may be initialized to x(0)=1, x(i)=0(i=1, 2, ..., 30) in the beginning of each OFDM symbol. The second m-sequence may be initialized in the beginning of each OFDM symbol according to a cell ID, a slot number in a radio frame, an OFDM symbol index in a slot, a CP length, etc.

The following equation shows an example of initialization of the second m-sequence.

$$\sum_{i=0}^{30} y(i) \cdot 2^i = \quad \text{[Math. 3]}$$

$$2^{10}(7(n\_s + 1) + l + 1)(2N\_cell\_ID + 1) + 2N\_cell\_ID + N\_CP$$

Herein, n_s denotes a slot number in a radio frame, l denotes an OFDM symbol index in a slot, and N_cell_ID denotes a cell ID. In case of a normal CP, N_CP is 1. In case of an extended CP, N_CP is 0.

When the common RS sequence is generated according to the aforementioned equations, the common RS sequence is irrelevant to antennas. Therefore, if the common RS is transmitted for each of a plurality of antennas in the same OFDM symbol, each of the plurality of antennas uses the same common RS sequence.

The common RS sequence generated for each OFDM symbol including the reference resource element is mapped to the reference resource element according to a common RS pattern. The common RS sequence may be sequentially mapped to the reference resource element in the frequency domain in an ascending order of a subcarrier index in the N_DL resource blocks. That is, the common RS may be transmitted throughout a full frequency band. In this case, the common RS sequence is generated for each antenna, and the common RS sequence is mapped to the reference resource element for each antenna.

Figure 11:
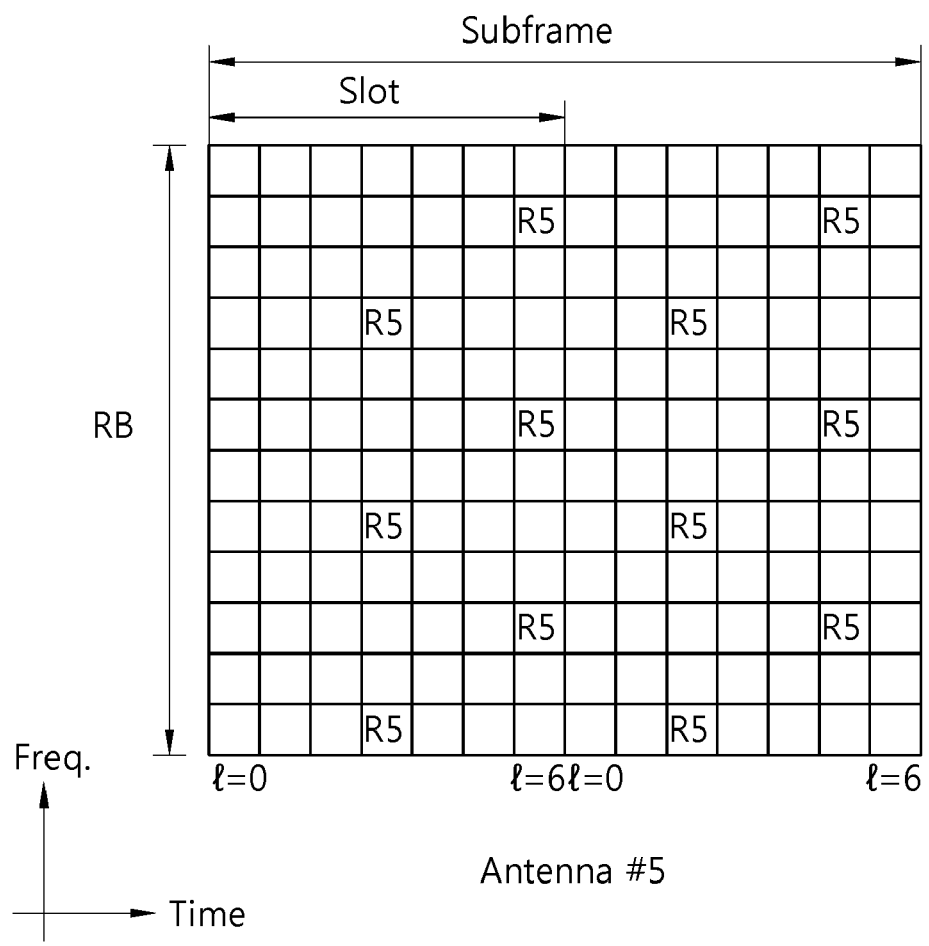
FIG. 11 shows exemplary mapping of a dedicated RS in a long term evolution (LTE) when using a normal CP.

FIG. 11 shows exemplary mapping of a dedicated RS in an LTE when using a normal CP.

Figure 12:
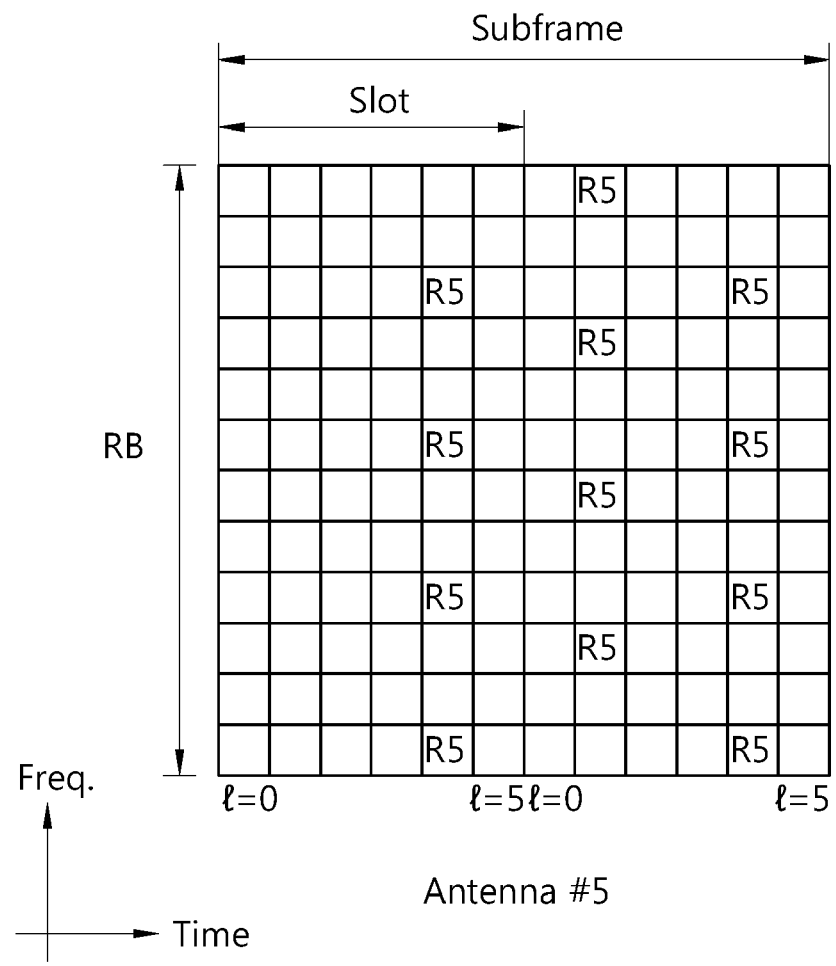
FIG. 12 shows exemplary mapping of a dedicated RS in an LTE when using an extended CP.

FIG. 12 shows exemplary mapping of a dedicated RS in an LTE when using an extended CP.

Referring to FIG. 11 and FIG. 12, R5 denotes a resource element used for dedicated RS transmission through an antenna #5. In the LTE, the dedicated RS is supported for single antenna transmission. Only when single antenna transmission through the antenna #5 is determined by a higher layer as DL data transmission over a PDSCH, the dedicated RS can exist and be useful for PDSCH demodulation. The dedicated RS may be transmitted only over a resource block to which the PDSCH is mapped. The dedicated RS corresponds to a set of reference resource elements in the resource block to which the PDSCH is mapped. A BS may transmit the dedicated RS by multiplying the dedicated RS by a predefined dedicated RS sequence. Herein, a basic unit is one subframe in a time domain and one resource block in a frequency domain.

The dedicated RS may be transmitted simultaneously with the common RS. Therefore, an RS overhead becomes significantly greater in comparison with an RS overhead for a case where only the common RS signal is transmitted. A UE may use the common RS and the dedicated RS together. In a control region for transmitting control information in a subframe, the UE uses the common RS. In a data region existing in the subframe other than the control region, the UE may use the dedicated RS. For example, the control region consists of OFDM symbols of which an OFDM symbol index t is 0 to 2 in a first slot of the subframe (see FIG. 4).

A dedicated RS pattern is an RS pattern of a dedicated RS and may be common to all UEs in a cell. However, to minimize inter-cell interference, the dedicated RS pattern may be determined in a cell-specific manner. The dedicated RS sequence may be determined in a UE-specific manner. Therefore, only a specific UE in the cell can receive the dedicated RS.

The dedicated RS sequence may be generated on a subframe basis. The dedicated RS sequence may differ according to a cell ID, a subframe location in one radio frame, a UE ID, etc.

The number of reference resource elements for the dedicated RS in a basic unit is 12. That is, the number of resource elements R5 in the basic unit is 12. If N_PDSCH denotes the number of resource blocks to which the PDSCH is mapped, the total number of resource elements R5 for the dedicated RS is 12(N_PDSCH. Therefore, a length of the dedicated RS sequence is 12(N_PDSCH. The length of the dedicated RS sequence may differ according to the number of resource blocks allocated to the UE for PDSCH transmission.

The following equation shows an example of a dedicated RS sequence r(m).

$$r(m) = \frac{1}{\sqrt{2}}(1 - 2 \cdot c(2m)) + j\frac{1}{\sqrt{2}}(1 - 2 \cdot c(2m + 1)), \quad \text{[Math. 4]}$$
$$m = 0, 1, \ldots, 12 \times N\_PDSCH - 1$$

Herein, c(i) denotes a PN sequence. c(i) may be determined by Equation 2 above. In this case, the second m-sequence may be initialized in the beginning of each subframe according to a cell ID, a subframe location in one radio frame, a UE ID, etc.

The following equation shows an example of initialization of the second m-sequence.

$$\sum_{i=0}^{30} y(i) \cdot 2^i = (\lfloor n\_s/2 \rfloor + 1) \cdot (2N\_cell\_ID + 1) \cdot 2^{16} + UE\_ID \quad \text{[Math. 5]}$$

Herein, n_s denotes a slot number in a radio frame, N_cell_ID denotes a cell ID, and UE_ID denotes a UE ID.

The dedicated RS sequence is mapped to the reference resource element according to the RS pattern in a resource block to which the PDSCH is mapped. In this case, the dedicated RS sequence is sequentially mapped in the resource block in an ascending order of a subcarrier, and is then mapped to a reference resource element in an ascending order of an OFDM symbol index.

Although the LTE supports the dedicated RS for single spatial stream or single antenna transmission as described above, an LTE-A also has to support the dedicated RS for multiple spatial stream transmission or multiple antenna transmission. Therefore, there is a need to provide a method and apparatus for transmitting a dedicated RS for multiple spatial stream transmission or multiple antenna transmission.

Hereinafter, a method and apparatus for transmitting information and a dedicated RS through multiple antennas will be described. The following description can also apply not only to the LTE-A system but alto to a conventional OFDM-MIMO system.

Figure 13:
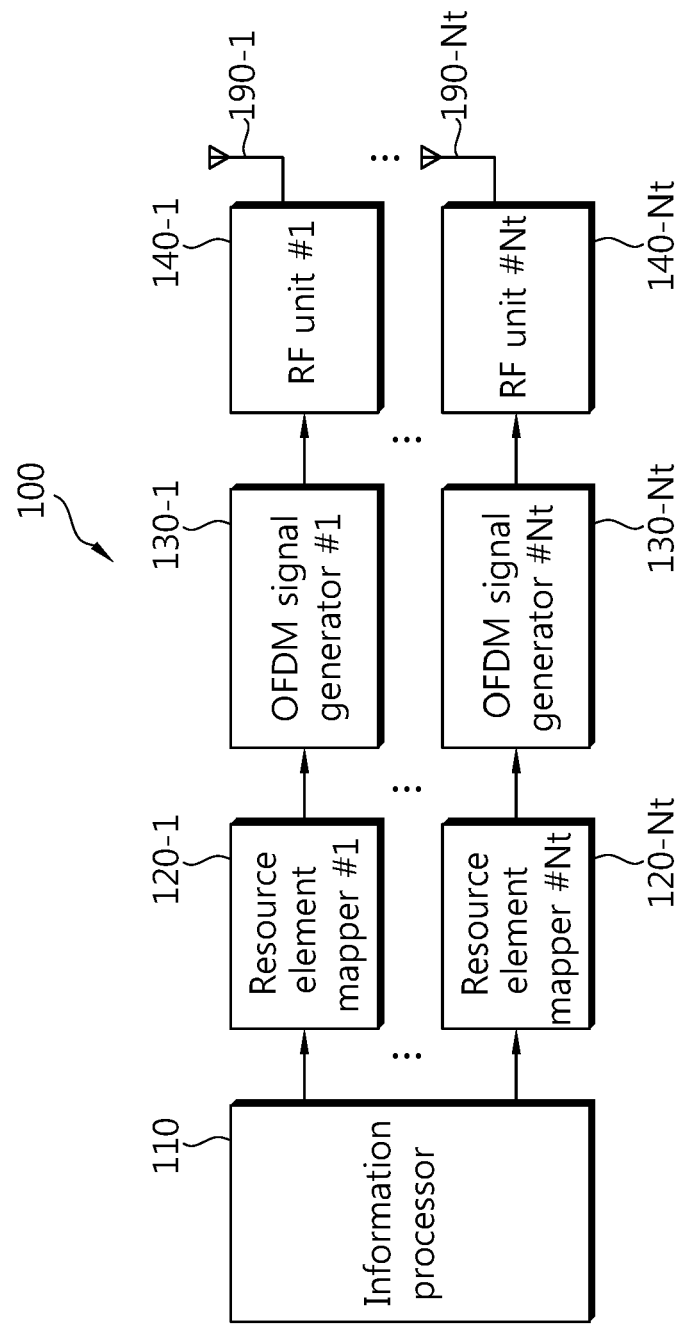
FIG. 13 is a block diagram showing an exemplary structure of a transmitter.

FIG. 13 is a block diagram showing an exemplary structure of a transmitter. The transmitter may be a part of a UE or a BS.

Referring to FIG. 13, a transmitter 100 includes an information processor 110, Nt resource element mappers 120-1, . . . , 120-Nt, Nt OFDM signal generators 130-1, . . . , 130-Nt, Nt radio frequency (RF) units 140-1, . . . , 140-Nt, and Nt transmit antennas 190-1, . . . , 190-Nt (where Nt is a natural number).

The information processor 110 is coupled to each of the Nt resource element mappers 120-1, . . . , 120-Nt. The Nt resource element mappers 120-1, . . . , 120-Nt are respectively coupled to the Nt OFDM signal generators 130-1, . . . , 130-Nt. The Nt OFDM signal generators 130-1, . . . , 130-Nt are respectively coupled to the Nt RF units 140-1, . . . , 140-Nt. The Nt RF units 140-1, . . . , 140-Nt are respectively coupled to the Nt transmit antennas 190-1, . . . , 190-Nt. That is, a resource element mapper #n 120-$n$ is coupled to an OFDM signal generator #n 130-$n$, the OFDM symbol generator #3 130-$n$ is coupled to an RF unit #n 140-$n$, and the RF unit #n 140-$n$ is coupled to a transmit antenna #n 190-$n$ (where n=1, . . . , Nt). In case of multiple antenna transmission, one resource grid is defined for each transmit antenna.

Information is input to the information processor 110. The information may be control information or data. The information may have a format of a bit or a bit-stream. The transmitter 100 can be implemented in a physical layer. In this case, the information may be derived from a higher layer such as a medium access control (MAC) layer.

The information processor 110 is configured to generate Nt transmit streams #1, #2, . . . , #Nt from the information. Each of the Nt transmit streams includes a plurality of transmit symbols. The transmit symbol may be a complex-valued symbol obtained by processing the information.

The Nt resource element mappers 120-1, . . . , 120-Nt are configured to receive the respective Nt transmit streams. That is, the resource element mapper #n 120-$n$ is configured to receive a transmit stream #n. The resource element mapper #n 120-$n$ is configured to map the transmit stream #n to resource elements in a resource block allocated for information transmission. Each transmit symbol of the transmit stream #n may be mapped to one resource element. '0' may be inserted to a resource element to which the transmit stream #n is not mapped.

One or more resource blocks may be allocated for information transmission. If a plurality of resource blocks are allocated, the plurality of resource blocks may be allocated either continuously or discontinuously.

Each of the Nt OFDM signal generators 130-1, . . . , 130-Nt is configured to generate a time-continuous OFDM signal for each OFDM symbol. The time-continuous OFDM signal is also referred to as an OFDM baseband signal. Each of the Nt OFDM signal generators 130-1, . . . , 130-Nt may generate an OFDM signal by performing inverse fast Fourier transform (IFFT), CP insertion, or the like on each OFDM symbol.

Each of the Nt RF units 140-1, . . . , 140-Nt converts its OFDM baseband signal into a radio signal. The OFDM baseband signal may be converted into the radio signal by performing up-conversion at a carrier frequency. The carrier frequency is also referred to as a center frequency. The transmitter 100 may use either a single carrier or multiple carriers.

Radio signals are respectively transmitted through the Nt transmit antennas 190-1, . . . , 190-Nt.

Figure 14:
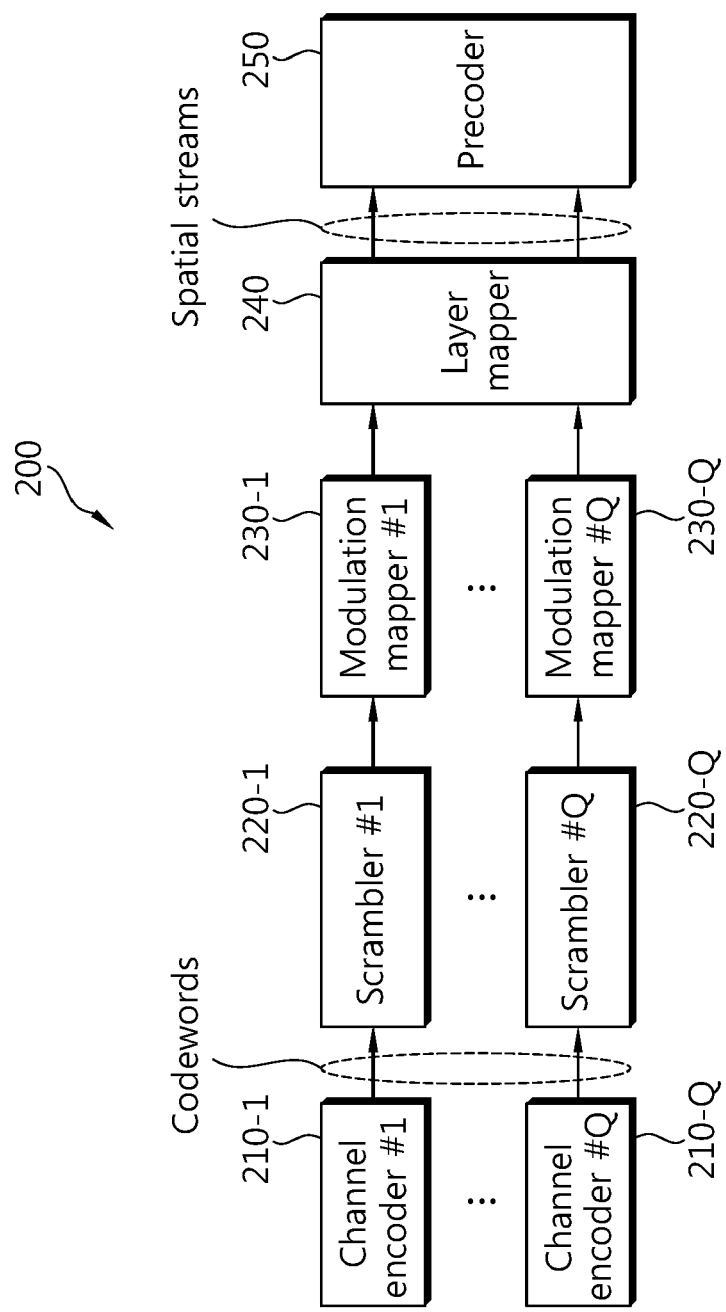
FIG. 14 is a block diagram showing an exemplary structure of an information processor of FIG. 13.

FIG. 14 is a block diagram showing an exemplary structure of the information processor of FIG. 13.

Referring to FIG. 14, an information processor 200 includes Q channel encoders 210-1, . . . , 210-Q, Q scramblers 220-1, . . . , 220-Q, Q modulation mappers 230-1, . . . , 230-Q, a layer mapper 240, and a precoder 250.

The Q channel encoders 210-1, . . . , 210-Q are respectively coupled to the Q scramblers 220-1, . . . , 220-Q. The Q scramblers 220-1, . . . , 220-Q are respectively coupled to the plurality of modulation mappers 230-1, . . . , 230-Q. The plurality of modulation mappers 230-1, . . . , 230-Q are coupled to the layer mapper 240. The layer mapper 240 is coupled to the precoder 250.

The precoder 250 is coupled to Nt resource element mappers (see FIG. 13). A channel encoder #q 210-$q$ is coupled to a scrambler #q 220-$q$ and the scrambler #q 220-$q$ is coupled to a modulation mapper #q 230-$q$ where q=1, . . . , Q).

Each of the Q channel encoders 210-1, . . . , 210-Q is configured to receive information bit, and to generate an encoded bit by performing channel coding on the information bit. The information bit corresponds to information to be transmitted by a transmitter. A size of the information bit may be various according to the information. A size of the encoded bit may also be various according to the size of the information bit and a channel coding scheme. There is no restriction on the channel coding scheme. Examples of the channel coding scheme may include turbo coding, convolution coding, block coding, etc. An encoded bit obtained by performing channel coding on the information bit is referred to as a codeword. Herein, Q denotes the number of codewords. The channel encoder #q 210-*q* outputs a codeword #q (where q=1, . . . , Q).

Each of the Q scramblers 220-1, . . . , 220-Q is configured to generate a scrambled bit for each codeword. The scrambled bit is generated by scrambling the encoded bit with a scrambling sequence. The scrambler #q 220-*q* is configured to generate a scrambled bit for the codeword #q (where q=1, . . . , Q).

Each of the Q modulation mappers 230-1, . . . , 230-Q is configured to generate a modulation symbol for each codeword. The modulation symbol may be complex-valued symbol. The modulation mapper #q 230-*q* is configured to generate a modulation symbol by mapping the scrambled bit for the codeword #q to a symbol for representing a location on a signal constellation (where q=1, . . . , Q). There is no restriction on a modulation scheme. For example, the modulation scheme may be m-phase shift keying (PSK) or m-quadrature amplitude modulation (QAM). The number of modulation symbols output from the modulation mapper #q 230-*q* for the codeword #q may be various according to a size of the scrambled bit and the modulation scheme.

The layer mapper 240 is configured to map a modulation symbol for each codeword to R spatial layers. The modulation symbol may be mapped to the spatial layers in various manners. R spatial streams are generated as a result. Herein, R denotes a rank. The rank R may be equal to or greater than the number Q of codewords.

The precoder 250 is configured to generate Nt transmit streams by performing precoding on the R spatial streams. The number Nt of transmit antennas is equal to or less than the rank R.

The Nt transmit streams generated by the precoder 250 are respectively input to the Nt resource element mappers (see FIG. 5). The Nt transmit streams are respectively transmitted through the Nt transmit antennas. That is, a transmit stream #n is input to a resource element mapper #n, and is transmitted through a transmit antenna #n (where n=1, 2, . . . , Nt).

As such, a MIMO scheme in which multiple spatial streams are simultaneously transmitted through a plurality of transmit antennas is referred to as spatial multiplexing. The spatial multiplexing includes single-user spatial multiplexing and multi-user spatial multiplexing. The single-user spatial multiplexing is referred to as single user (SU)-MIMO. The multi-user spatial multiplexing is referred to as multi user (MU)-MIMO. The MU-MIMO can be supported in both uplink and downlink transmissions.

In case of the SU-MIMO, a plurality of spatial layers are all allocated to one UE. Through the plurality of spatial layers allocated to one UE, the multiple spatial streams are transmitted by using the same time-frequency resource.

In case of the MU-MIMO, a plurality of spatial layers are allocated to a plurality of UEs. The multiple spatial streams allocated to the plurality of UEs are transmitted by using the same time-frequency resource. A different spatial layer is allocated to a different UE. If R denotes a rank, R spatial streams can be allocated to K UEs (where 2(K(R, and K is a natural number). Each of the K UEs simultaneously shares a time-frequency resource used for multiple spatial stream transmission.

A dedicated RS for multiple antenna transmission may be either a precoded RS or a non-precoded RS.

The non-precoded RS is an RS which is always transmitted by the number of transmit antennas irrespective of the number of spatial layers. The non-precoded RS has an independent RS for each transmit antenna. In general, the common RS is the non-precoded RS. This is because a precoder is generally used for a specific UE. However, if a cell-specific precoder exists in a specific system, virtualization is considered rather than precoding.

The precoded RS is an RS which is transmitted by the number of spatial layers. The precoded RS has an independent RS for each spatial layer.

Figure 15:
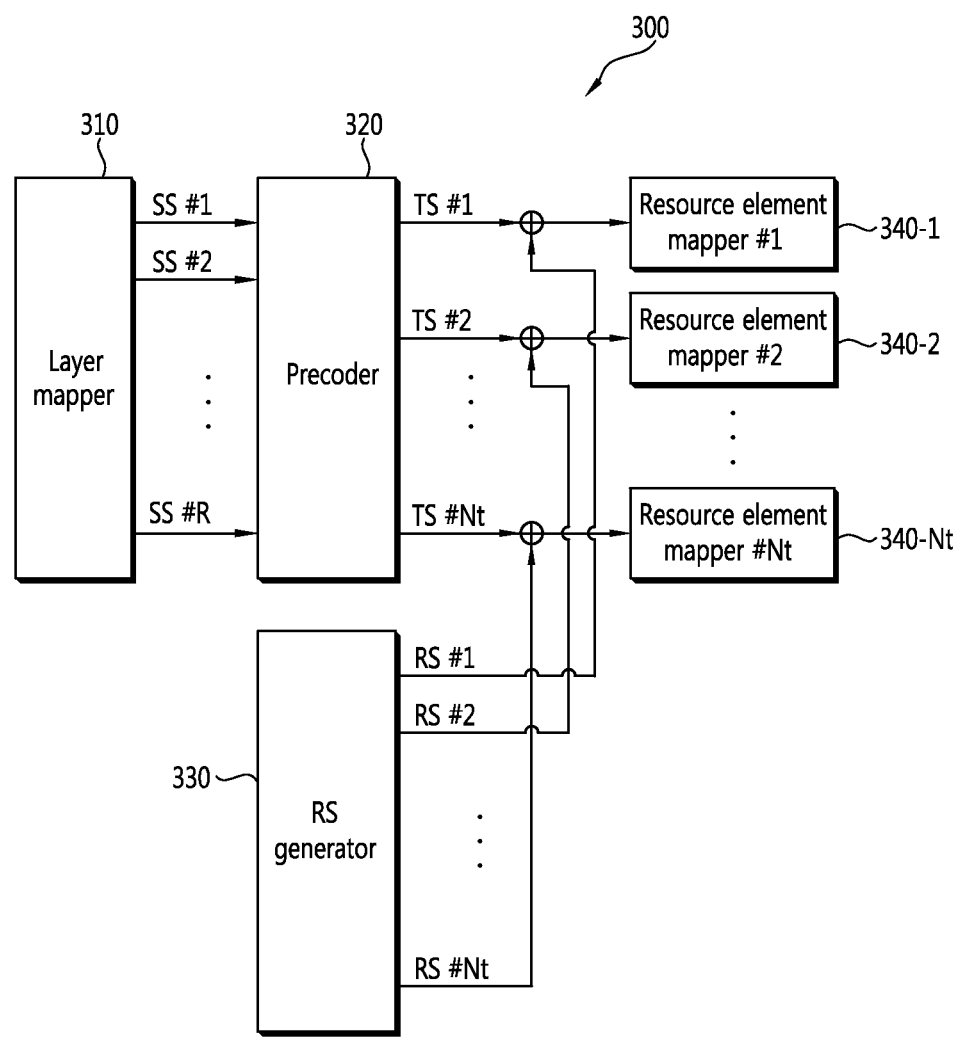
FIG. 15 is a block diagram showing an exemplary structure of a transmitter for generating a non-precoded dedicated RS.

FIG. 15 is a block diagram showing an exemplary structure of a transmitter for generating a non-precoded dedicated RS.

Referring to FIG. 15, a transmitter 300 includes a layer mapper 310, a precoder 320, an RS generator 330, and Nt resource element mappers 340-1, . . . , 340-Nt. Herein, Nt denotes the number of transmit antennas of the transmitter 300. Although not shown in FIG. 15, the structures of FIG. 13 and FIG. 14 may be used by reference in the description of the structure of the transmitter 300. It is assumed that the number of spatial layers is R.

The layer mapper 310 is coupled to the precoder 320. Each of the precoder 320 and the RS generator 330 is coupled to the Nt resource element mappers 340-1, . . . , 340-Nt.

The layer mapper 310 is configured to generate R spatial streams SS #1, SS #2, . . . , SS #R for the R spatial layers.

The precoder 320 is configured to generate Nt transmit streams TS #1, TS #2, . . . , TS #Nt by performing precoding on the R spatial streams.

The RS generator 330 generates an RS sequence in association with an RS. The RS sequence consists of a plurality of reference symbols. Any sequence may be used for the RS sequence, without any particularly restriction.

The RS generator 330 is configured to generate an RS sequence for each of the Nt transmit antennas. The RS generator 330 is configured to generate Nt RS sequences RS #1, RS #2, . . . , RS #Nt. Each of the Nt RS sequences includes a plurality of RS symbols. The RS symbol may be a complex-valued symbol.

Each of the Nt resource element mappers 340-1, . . . , 340-Nt is configured to receive a transmit stream and an RS sequence and to map the transmit stream and the RS sequence to resource elements. A resource element mapper #n 340-*n* may receive a TS #n and an RS #n and map them to resource elements (where n=1, 2, . . . , Nt).

Figure 16:
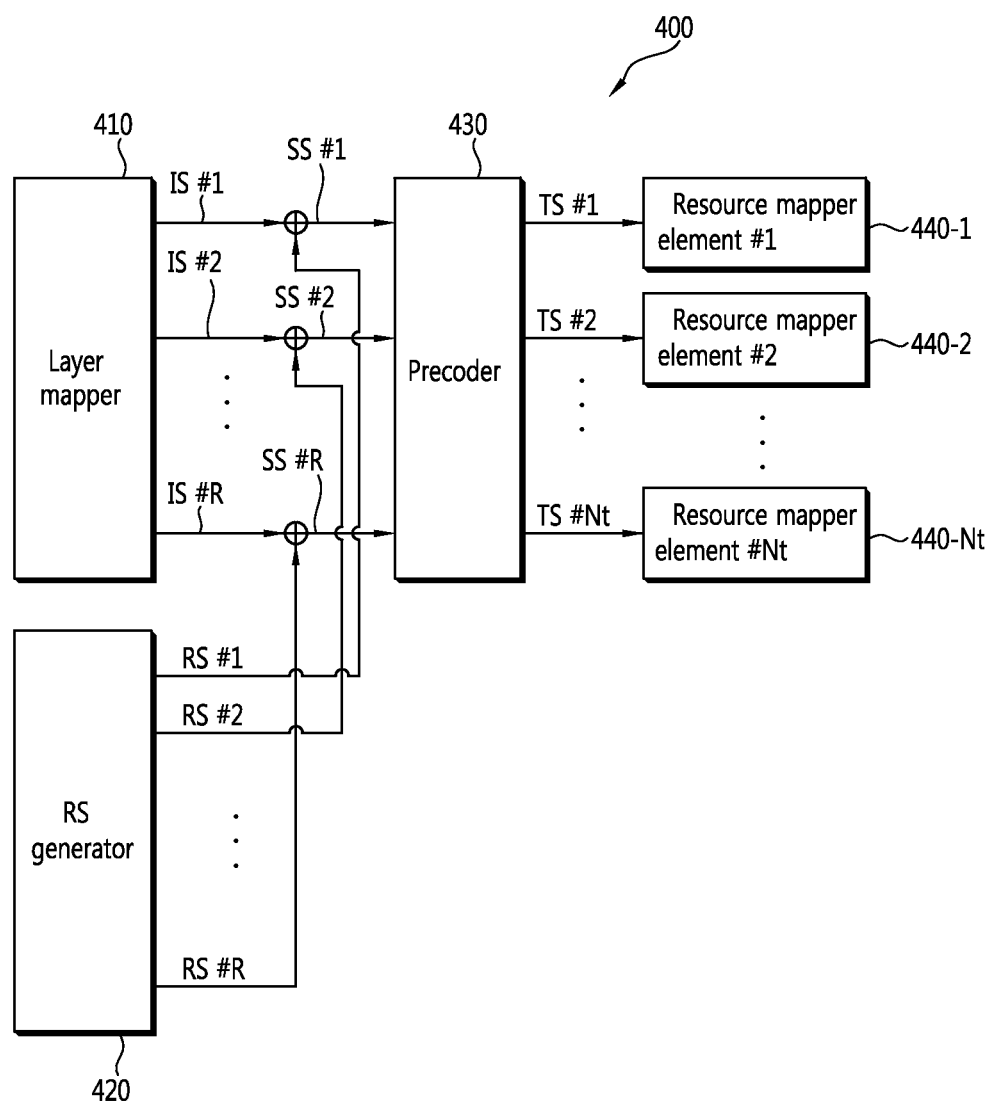
FIG. 16 is a block diagram showing an exemplary structure of a transmitter for generating a precoded dedicated RS.

FIG. 16 is a block diagram showing an exemplary structure of a transmitter for generating a precoded dedicated RS.

Referring to FIG. 16, a transmitter 400 includes a layer mapper 410, an RS generator 420, a precoder 430, and Nt resource element mappers 440-1, . . . , 440-Nt. Herein, Nt denotes the number of transmit antennas of the transmitter 400. Although not shown in FIG. 16, the structures of FIG. 13 and FIG. 14 may be used by reference in the description of the structure of the transmitter 400. It is assumed that the number of spatial layers is R.

Each of the layer mapper 410 and the RS generator 420 is coupled to the precoder 430. The precoder 430 is coupled to the Nt resource element mappers 440-1, . . . , 440-Nt. The layer mapper 410 is configured to generate R information streams. The R information streams can be expressed by IS #1, IS #2, . . . , IS #R.

The RS generator 420 is configured to generate R RS sequences. The R RS sequences can be expressed by RS #1, RS #2, . . . , RS #R. Each of the R RS sequences includes a plurality of RS symbols. The RS symbol may be a complex-valued symbol.

An information stream, an RS sequence, and an RS pattern are allocated to each of the R spatial layers. An IS #r and an RS #r are allocated to a spatial layer #r (where r=1, . . . , R). Herein, r denotes a spatial layer index indicating a spatial layer. An RS pattern allocated to the spatial layer #r is a time-frequency resource pattern used for RS #r transmission.

The precoder 430 is configured to generate Nt transmit streams by performing precoding on R spatial streams. The R spatial streams can be expressed by SS #1, SS #2, . . . , SS #R. The Nt transmit streams can be expressed by TS #1, TS #2, . . . , TS #Nt.

Each of the R spatial streams corresponds to one spatial layer. That is, an SS #r corresponds to a spatial layer #r (where r=1, . . . , R). Each of the R spatial streams is generated based on an information stream, RS sequence, RS pattern allocated to a corresponding spatial layer. That is, the SS #r is generated based on an RS pattern allocated to the IS #r, the RS #r, and the spatial layer #r.

Figure 17:
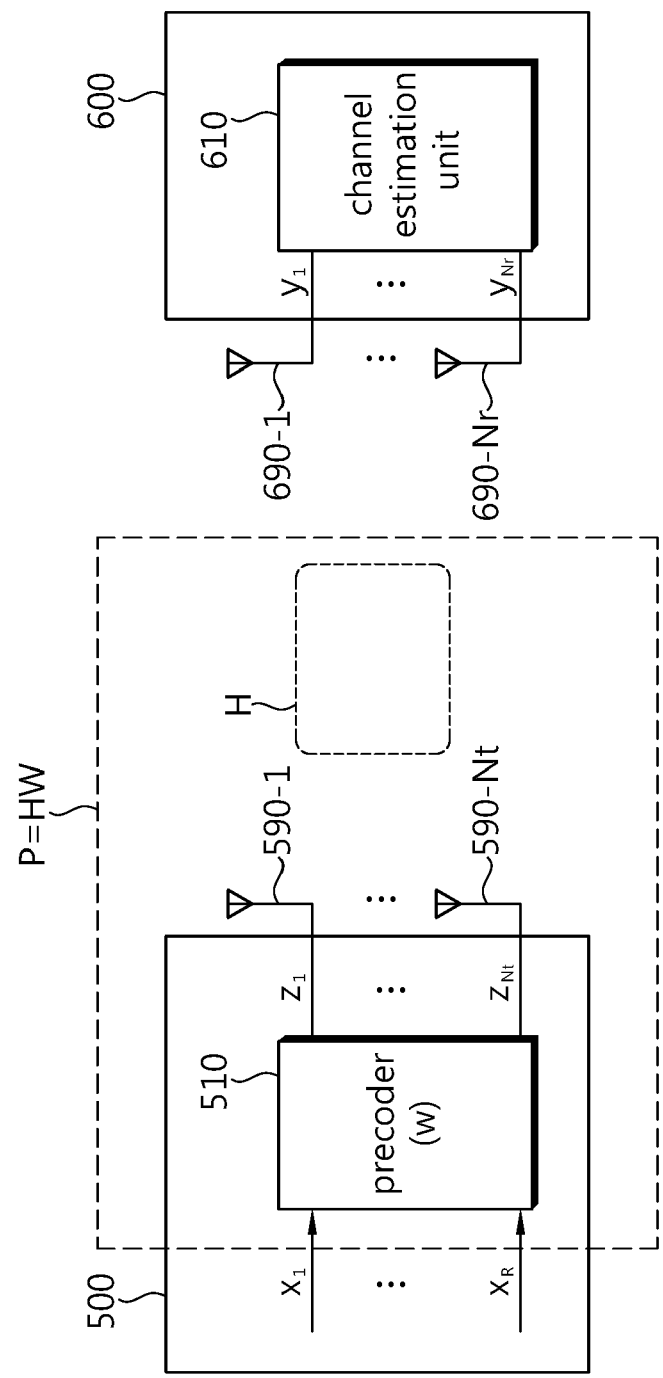
FIG. 17 is a block diagram showing an exemplary apparatus for wireless communication using a precoded dedicated RS.

FIG. 17 is a block diagram showing an exemplary apparatus for wireless communication using a precoded dedicated RS.

Referring to FIG. 17, a transmitter 500 includes a precoder 510 and Nt transmit antennas 590-1, . . . , 590-Nt. The precoder 510 is coupled to the Nt transmit antennas 590-1, . . . , 590-Nt. A receiver 600 includes a channel estimation unit 610 and Nr receive antennas 690-1, . . . , 690-Nr. The transmitter 500 may be a part of a BS, and the receiver 600 may be a part of a UE.

A MIMO channel matrix H is formed between the Nt transmit antennas 590-1, . . . , 590-Nt and the Nr receive antennas 690-1, . . . , 690-Nr. The MIMO channel matrix H has a size of Nr(Nt. If the number of receive antennas is 1, the MIMO channel matrix is a row vector. In general, a matrix conceptually includes a row vector as well as the column vector.

R spatial streams are input to the precoder 510. Each of the R spatial streams includes a plurality of spatial symbols. The spatial symbol may be a complex-valued symbol. A spatial symbol #k of an SS #r can be expressed by $x_r(k)$ (r=1, 2, . . . , R). The spatial symbol #k of the R spatial streams can be expressed by a spatial symbol vector $x(k)=[x_1(k)\ x_2(k)\ x_R(k)]^T$. Herein, $[\cdot]^T$ denotes a transposed matrix of $[\cdot]$, and k denotes a time-frequency resource index indicating a time-frequency resource for transmitting the spatial symbol vector. For example, the time-frequency resource indicted by k may be a subcarrier or a resource element.

$x_r(k)$ is determined according to an RS pattern allocated to a spatial layer #r. $x_r(k)$ may be an information symbol of the SS #r or an RS symbol of an RS #r according to the RS pattern. Alternatively, $x_r(k)$ may be set to". As such, each of the R spatial streams is generated on the basis of an information stream, an RS sequence, and an RS pattern which are allocated to corresponding spatial layers.

The precoder 510 can perform precoding as expressed by the following equation.

$$z(k)=W \cdot x(k) \quad \text{[Math.6]}$$

Herein, $z(k)=[z_1(k)\ z_2(k)\ \ldots\ z_{Nt}(k)]^T$ denotes a transmit symbol vector, W denotes a precoding matrix having a size of Nt×R, and $x(k)=[x_1(k)\ x_2(k)\ x_R(k)]^T$ denotes a spatial symbol vector. Nt denotes the number of transmit antennas, and R denotes a rank. If the rank is 1 (i.e., R=1), the precoding matrix is a column vector.

The transmitter 500 transmits a transmit symbol vector z(k) through the Nt transmit antennas 590-1, . . . , 590-Nt.

In case of MU-MIMO, R spatial layers are allocated to K UEs (2(K(R, where K is a natural number). In case of MU-MIMO, the precoding matrix can be regarded as a MU-MIMO precoding matrix. If W is the MU-MIMO precoding matrix, a BS may create the matrix W by reconfiguring channel state information (CSI) fed back from each of the K UEs. Alternatively, the BS may randomly configure the matrix W by using the CSI fed back from each of the K UEs.

The CSI denotes general information on a downlink channel. There is no particular restriction on the CSI. The CSI may include at least one of a channel quality indicator (CQI), a precoding matrix indicator (PMI), and a rank indicator (RI). The CQI indicates an MCS level suitable for a channel. The PMI indicates a precoding matrix suitable for the channel. The RI indicates a rank of the channel. The PMI may be a simple matrix index in a codebook. Alternatively, the PMI may be channel quantization information, channel covariance matrix, etc.

As such, when a precoded RS is used, an RS symbol of an RS sequence for each spatial layer is also precoded and transmitted together with an information symbol of an information stream.

The receiver 600 receives a receive signal vector $y=[y_1 y_2\ \ldots\ y_{Nr}]^T$ through the Nr receive antennas 690-1, . . . , 690-Nr. The receive signal vector y can be expressed by the following equation.

$$\begin{aligned} y &= HWx + n \\ &= Px + n \end{aligned} \quad \text{[Math. 7]}$$

Herein, $n=[n_1 n_2\ \ldots\ n_{Nr}]^T$ denotes a noise vector, and P=HW denotes a precoded channel matrix.

The channel estimation unit 610 may estimate a precoded channel matrix P from the received signal vector on the basis of the precoded dedicated RS. When the precoded channel matrix P is estimated, the receiver 600 may estimate an information stream transmitted for each spatial layer. Even if the receiver 600 cannot know the precoding matrix W and thus cannot estimate the MIMO channel matrix H, the receiver 600 can demodulate information by estimating the precoded channel matrix P.

When the precoded dedicated RS is used as described above, the transmitter does not have to report the receiver a precoding matrix used for transmission. The receiver can explicitly demodulate information even if the receiver does not know the precoding matrix. When the precoded dedicated RS is used, the transmitter does not have to limit the precoding matrix. In general, the precoded dedicated RS is used to implement non-codebook based precoding.

Precoding may be performed using one precoding matrix throughout a full frequency band. This is referred to as wideband precoding. In this case, one precoding matrix is used for one UE.

Meanwhile, a channel may be either a frequency selective channel or a frequency flat channel. Whether the channel is the frequency selective channel or the frequency flat channel may be determined on the basis of a coherent bandwidth. The coherent bandwidth is inverse proportional to a delay spread.

In case of the frequency selective channel, a property of a MIMO channel may vary depending on a frequency band. As long as a spatial channel correlation is relatively low, a different precoding matrix may be used according to the frequency band to obtain a higher performance gain.

Frequency selective precoding is precoding performed using a different precoding matrix according to the frequency band. In this case, a multiple precoding matrix may be used for one UE. When the multiple precoding matrix is used together with the precoded dedicated RS, the dedicated RS has to be precoded using a precoding matrix corresponding to the frequency band. The frequency selective precoding may also apply not only to the frequency selective channel but also to the frequency flat channel.

When demodulation is performed using the precoded dedicated RS, the receiver performs channel estimation only in a resource block allocated for information reception. If the receiver is a part of the UE, the UE can know the resource block allocated for information reception by using a resource allocation field included in a DL grant. One or more resource blocks may be allocated to the receiver. When a plurality of resource blocks are allocated, the plurality of resource blocks may be allocated either consecutively or non-consecutively.

When the wideband precoding is used, the receiver can perform channel estimation by using channel interpolation throughout the allocated resource block. In case of using the frequency selective precoding, the plurality of precoding matrices can be used in the resource block allocated to the receiver. When the receiver cannot know a frequency region in which a coherent precoding matrix is used, the receiver can estimate a channel on a resource block basis. However, since the channel interpolation cannot be performed throughout a plurality of resource blocks, channel estimation performance may deteriorate. If the receiver can know the frequency region in which the coherent precoding matrix is used, the receiver can perform channel estimation by using the channel interpolation in the frequency region in which the coherent precoding matrix is used. If the channel is estimated by using the channel interpolation, noise and interference can be suppressed, thereby capable of increasing channel estimation performance.

Therefore, the receiver needs to know information on the frequency region in which the same precoding matrix is used. The frequency region in which the same precoding matrix is used may be pre-agreed between the transmitter and the receiver. Alternatively, the transmitter may report to the receiver the frequency region in which the same precoding matrix is used.

Figure 18:
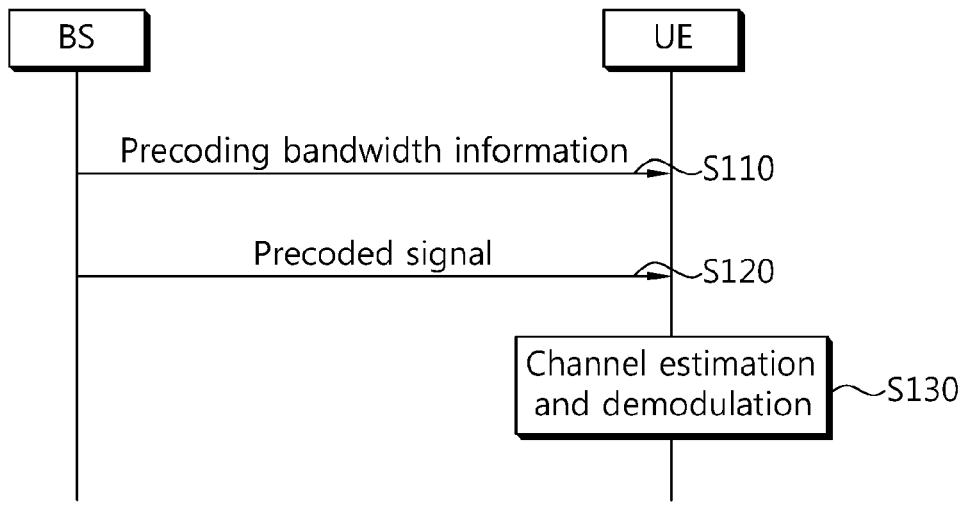
FIG. 18 is a flowchart showing a signal transmission method in a wireless communication system according to an embodiment of the present invention.

FIG. 18 is a flowchart showing a signal transmission method in a wireless communication system according to an embodiment of the present invention.

Referring to FIG. 18, a BS indicates precoding bandwidth information to a UE (step S110). The precoding bandwidth information is information on a frequency region in which a coherent precoding matrix is used. The frequency region in which the coherent precoding matrix is used may also be referred to as a precoding subband. That is, precoding matrices are identical in the precoding subband. For example, the precoding subband may be a plurality of consecutive resource blocks or a plurality of consecutive resource elements (or subcarriers). The precoding bandwidth information may indicate a size of the precoding subband. A precoding granularity may be determined according to the size of the precoding subband.

The BS may indicate the precoding bandwidth to the UE either explicitly or implicitly. The BS may explicitly indicate the precoding bandwidth information by using physical layer signaling or higher layer signaling such as RRC signaling. In case of the physical layer signaling, the precoding bandwidth information may be transmitted over a PDCCH. In this case, the precoding bandwidth information may be included in a DL grant.

The BS transmits a precoded signal to the UE (step S120). The precoded signal is a signal obtained by precoding an RS for each spatial layer and information for each spatial layer.

The UE estimates a channel on the basis of the RS for each spatial layer, and demodulates the information for each spatial layer (step S130).

In a frequency division duplex (FDD) scheme, the BS cannot know a downlink channel property. The UE estimates a downlink channel, and feeds back CSI for the downlink channel property over a feedback channel. In this case, the UE can estimate the downlink channel by using a common RS such as a CSI-RS.

In a time division duplex (TDD) scheme, channel reciprocity exists in which an uplink channel property and a downlink channel property are almost reciprocal. In case of using the TDD scheme, the UE can also feed back the CSI for the downlink channel property.

The BS may use the fed back CSI in downlink transmission. The CSI includes a PMI, and the BS may transmit information to the UE on the basis of the fed back PMI. Such an information transmission mechanism is referred to as a closed-loop mechanism. The closed-loop mechanism transmits information in a channel adaptive manner, thereby improving system performance.

The BS may not use the fed back CSI in downlink transmission. Such an information transmission mechanism is referred to as an open-loop mechanism. In case of the open-loop mechanism, the UE may not feed back the PMI.

The frequency selective precoding may be used both in the closed-loop mechanism and the open-loop mechanism. In case of the closed-loop mechanism, a multiple precoding matrix may be used to optimize precoding performance according to a frequency band. In case of the open-loop mechanism, the multiple precoding matrix may be used either randomly or in a predefined manner. Accordingly, a frequency diversity can increase without having to feed back specific spatial channel information such as the PMI. In both the close-loop mechanism and the open-loop mechanism, it is preferable that the UE knows the precoding bandwidth information.

Hereinafter, a method of indicating precoding bandwidth information by a BS to a UE will be described.

1. Reuse of feedback subband definition in closed-loop mechanism

In the FDD scheme, each of wideband precoding and frequency selective precoding may be associated with PMI feedback. CSI may be channel state information for a full frequency band or channel state information for a feedback subband which is a part of the full frequency band.

Definition on the feedback subband may be reused for a precoding subband. A size of the precoding subband is equal to a size of the feedback subband.

The feedback subband may be a plurality of consecutive resource blocks or a plurality of consecutive resource elements (or subcarriers). In general, the feedback subband may be an aggregation of resource blocks. For example, the size of the feedback subband may be 4 resource blocks, 8 resource blocks, or the like. The size of the feedback subband may vary depending on a downlink transmission bandwidth.

The size of the feedback subband may be set by the BS. The BS may set the size of the feedback subband by using a higher layer such as an RRC. Precoding bandwidth information is implicitly indicated by the feedback subband size set by the BS. Alternatively, the feedback subband size may be predefined between the BS and the UE. In this case, the feedback subband size may be pre-defined according to the downlink transmission bandwidth.

Examples of a PMI feedback type may include a single PMI type and a multiple PMI type. In case of the single PMI type, the UE may feed back one PMI throughout a full frequency band. In case of the multiple PMI type, the UE may feed back PMIs for respective feedback subbands. The PMI feedback type may be set by using a higher layer such as an RRC.

In a case where the PMI feedback type is the multiple PMI type, the feedback subband size can be pre-defined according to the downlink transmission bandwidth.

The following table shows the feedback subband size with respect to the downlink transmission bandwidth N_DL.

TABLE 1

| Downlink Transmission Bandwidth (N_DL) | Feedback Subband Size (k) |
|---|---|
| 6-7 | NA |
| 8-10 | 4 |
| 11-26 | 4 |
| 27-63 | 6 |
| 64-110 | 8 |

Figure 19:
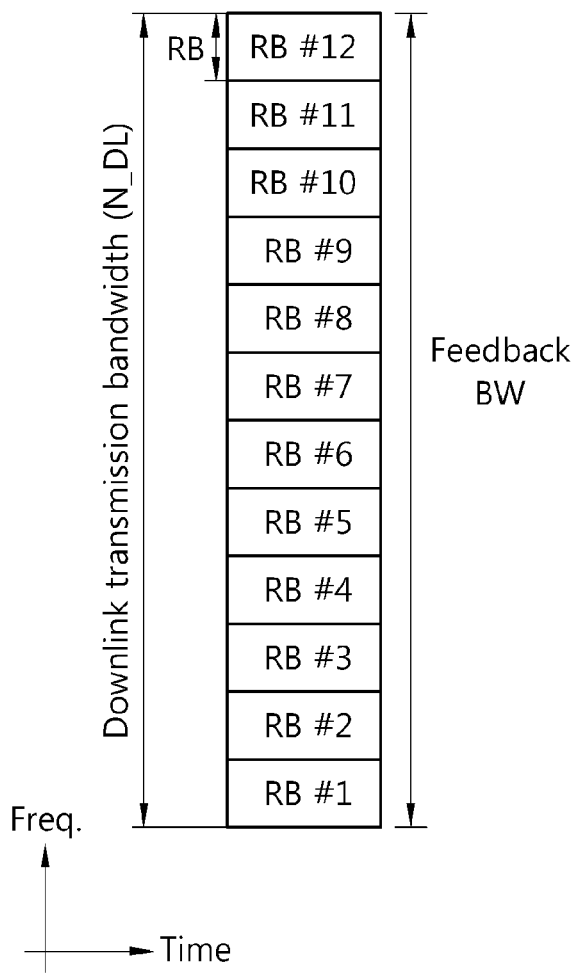
FIG. 19 shows an example of a feedback subband when using a single precoding matrix indicator (PMI) type.

FIG. 19 shows an example of a feedback subband when using the single PMI type.

Referring to FIG. 19, a downlink transmission bandwidth N_DL is 12. A full frequency band includes 12 resource blocks (RBs), i.e., RB #1, RB #2, . . . , RB #12. It is assumed that the PMI feedback type is set to the single PMI type by using higher layer signaling. A feedback bandwidth is the full frequency band. The UE feeds back one PMI throughout the full frequency band.

Figure 20:
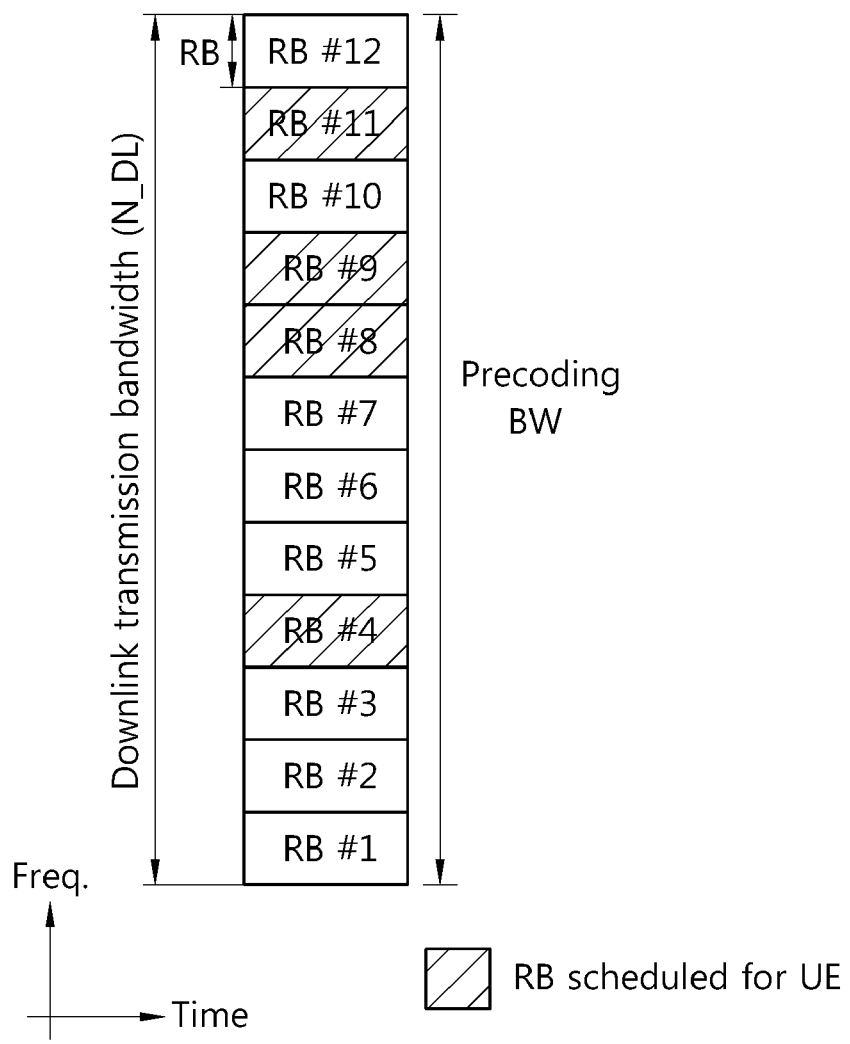
FIG. 20 shows an example of a precoding subband when using a single PMI type.

FIG. 20 shows an example of a precoding subband when using the single PMI type.

Referring to FIG. 20, RB #4, RB #8, RB #9, and RB #11 are RBs scheduled for the UE. The RB #4, RB #8, RB #9, and RB #11 are allocated to the UE to receive information. Information on the RBs allocated to the UE may be included in a DL grant. As such, a plurality of RBs may be allocated to the UE in a non-consecutive manner.

It is assumed that the PMI feedback type is set to the single PMI type by using higher layer signaling. It is also assumed that definition on a feedback subband is reused for the precoding subband. In this case, a precoding bandwidth is the full frequency band. Therefore, the UE can perform channel estimation by using channel interpolation throughout all allocated RBs, i.e., RB #4, RB #8, RB #9, and RB #11.

When multiple carriers are supported, it can be assumed that the same precoding matrix is used for the full frequency band in one carrier.

Figure 21:
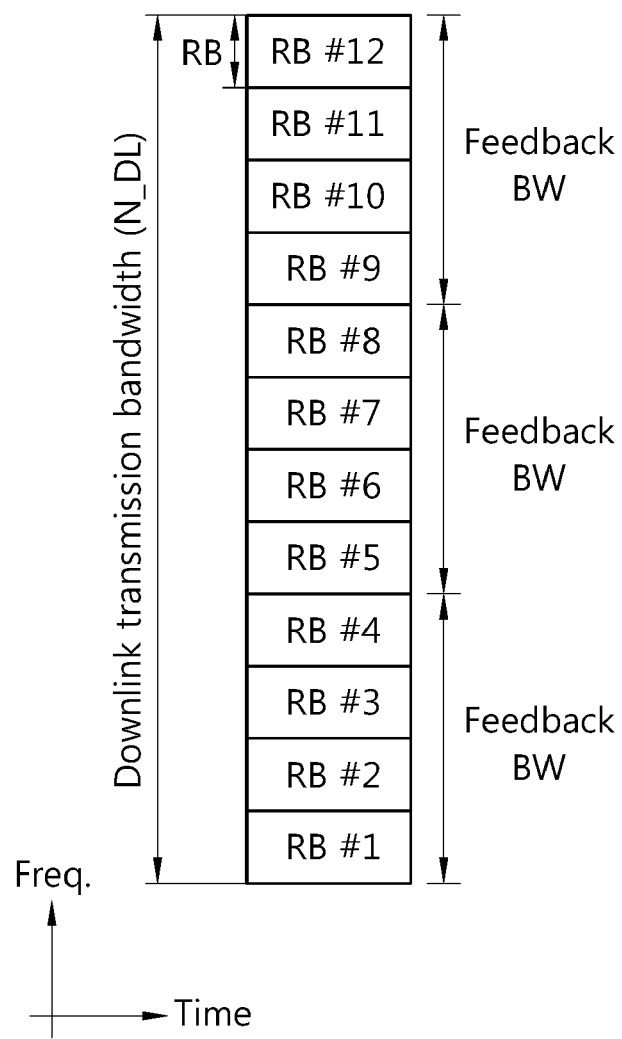
FIG. 21 shows an example of a feedback subband when using a multiple PMI type

FIG. 21 shows an example of a feedback subband when using the multiple PMI type.

Referring to FIG. 21, a downlink transmission bandwidth N_DL is 12. A full frequency band includes 12 RBs, i.e., RB #1, RB #2, . . . , RB #12. It is assumed that the PMI feedback type is set to the multiple PMI type by using higher layer signaling. Referring to Table 1, a feedback subband size is 4. Therefore, a feedback bandwidth is 4 RBs. The UE feeds back one PMI for every 4 RBs.

Figure 22:
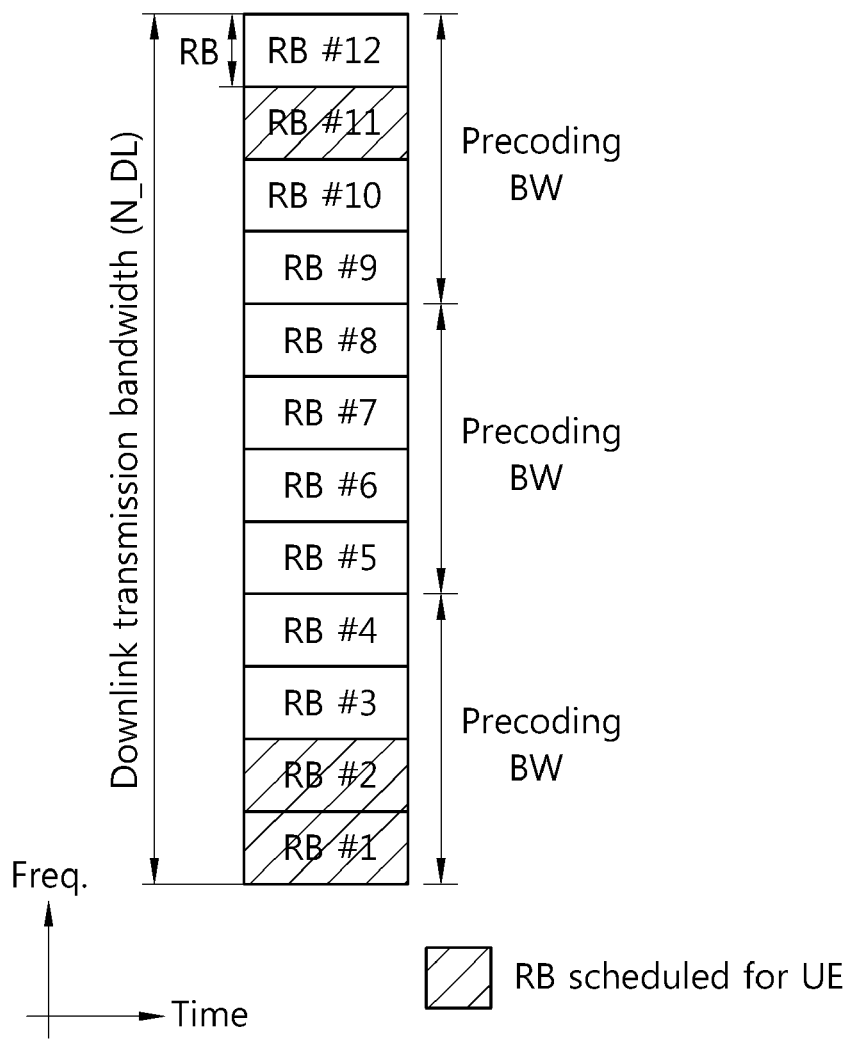
FIG. 22 shows an example of a precoding subband when using a multiple PMI type.

FIG. 22 shows an example of a precoding subband when using the multiple PMI type.

Referring to FIG. 22, RB #1, RB #2, and RB #11 are RBs scheduled for the UE. It is assumed that the PMI feedback type is set to the multiple PMI type by using higher layer signaling. It is also assumed that definition on a feedback subband is reused for the precoding subband. Since a feedback subband size is 4, the precoding subband corresponds to 4 RBs. The UE may expect that a single precoding matrix is used in the precoding subband. Therefore, the UE can perform channel estimation by using channel interpolation in the precoding subband.

The RB#1 and the RB#2 are RBs included in one precoding subband, and the RB#11 is an RB included in another precoding subband. Therefore, the UE can perform channel estimation by using channel interpolation throughout the RB#1 and the RB#2. When channel estimation is performed on the RB#11, the UE does not perform channel interpolation on the RB#1 and the RB#2.

2. Separate Precoding Bandwidth

Even if the BS receives a PMI fed back from the UE, the BS may use another precoding matrix according to a preference of the BS. In this case, a precoding subband may be defined independently from a feedback subband. A precoding bandwidth may be defined variously. Precoding bandwidth information reported by the BS to the UE may be a precoding subband index indicating the precoding bandwidth.

The following table shows an example of the precoding bandwidth depending on the precoding subband index when 2 bits are used to express the precoding subband index.

TABLE 2

| Precoding Subband Index | Precoding BW(# of RB) |
|---|---|
| 0 | 4 |
| 1 | 6 |
| 2 | 8 |
| 3 | 12 |

The following table shows an example of the precoding bandwidth depending on the precoding subband index when 3 bits are used to express the precoding subband index.

TABLE 3

| Precoding Subband Index | Precoding BW(# of RB) |
|---|---|
| 0 | 2 |
| 1 | 4 |
| 2 | 6 |
| 3 | 8 |
| 4 | 10 |
| 5 | 12 |
| 6 | 14 |
| 7 | 16 |

A maximum precoding bandwidth may be a full frequency band. In this case, the precoding subband index may indicate wideband precoding. The following table shows an example of the precoding bandwidth depending on the precoding subband index.

TABLE 4

| Precoding Subband Index | Precoding BW(# of RB) |
|---|---|
| 0 | 2 |
| 1 | 4 |
| 2 | 6 |
| 3 | 8 |
| 4 | 10 |
| 5 | 12 |
| 6 | 14 |
| 7 | Wideband precoding |

A minimum precoding bandwidth may be one RB. The following table indicates another example of the precoding bandwidth depending on the precoding subband index.

TABLE 5

| Precoding Subband Index | Precoding BW(# of RB) |
|---|---|
| 0 | 1 |
| 1 | 4 |

TABLE 5-continued

| Precoding Subband Index | Precoding BW(# of RB) |
|---|---|
| 2 | 6 |
| 3 | 8 |
| 4 | 10 |
| 5 | 12 |
| 6 | 14 |
| 7 | Wideband precoding |

An N-bit precoding subband index may be transmitted over a PDCCH by being included in a DL grant. Alternatively, the N-bit precoding subband index may be transmitted by using higher layer signaling.

3. Precoding Bandwidth Information in Open-Loop Mechanism

In case of the open-loop mechanism, the UE does not have to feed back a PMI. In case of the open-loop mechanism, a higher diversity gain is required in comparison with the closed-loop mechanism. As one example of a diversity mode, precoding matrix switching (PMS) may be used to increase a diversity gain. The PMS may be implemented with matrices in a code book. The matrices may vary depending on a precoding subband. The precoding subband may be defined with one or more RB levels. The precoding matrix may vary even in one RB. In this case, a precoding bandwidth may be defined with one or more resource element levels. For example, the precoding bandwidth may be 6 resource elements.

The precoding bandwidth may be determined according to a transmission scheme. For example, if open-loop spatial multiplexing is determined as the transmission scheme, the precoding bandwidth may be determined with k RBs. k may be determined by the BS or may be pre-defined. If k is determined by the BS, the BS may indicate k to the UE by using physical layer signaling or higher layer signaling. If the closed-loop spatial multiplexing is determined as the transmission scheme, wideband precoding may be used.

The following table shows an example of the precoding bandwidth according to the transmission scheme.

TABLE 6

| Transmission Scheme | Precoding BW(# of RB) |
|---|---|
| 6-7 | k |
| 8-10 | Wideband precoding |

4. Feedback Confirmation

A confirmation bit may be used for frequency selective precoding together with a dedicated RS. The confirmation bit may indicate whether a precoding subband is identical to a feedback subband. If the BS indicates PMI feedback for each feedback subband, the confirmation bit may be used to determine whether to apply the frequency selective precoding in which the precoding subband is identical to the feedback subband. The UE can know precoding bandwidth information by using the confirmation bit. The BS may transmit the confirmation bit to the UE by using physical layer signaling or higher layer signaling.

5. Unified Mode

In both the closed-loop mechanism and the open-loop mechanism, the BS can indicate a precoding bandwidth by using a precoding subband index. Tables 2 to 5 may be used by reference for the precoding bandwidth depending on the precoding subband index. However, this is for exemplary purposes only, and thus the precoding bandwidth depending on the precoding subband index is not limited thereto. The precoding subband index may be transmitted to the UE by using physical layer signaling or higher layer signaling.

In case of the open-loop mechanism, the BS may limit an available precoding bandwidth. The precoding bandwidth available in the open-loop mechanism may be a subset of precoding bandwidths available in the closed-loop mechanism. As shown in the following table, the available precoding bandwidth may be limited when using the open-loop mechanism.

TABLE 7

| Precoding Subband Index | Precoding BW(# of RB) |
|---|---|
| 0 | 1(open-loop, closed-loop) |
| 1 | 4(open-loop, closed-loop) |
| 2 | 6(closed-loop only) |
| 3 | 8(closed-loop only) |
| 4 | 10(closed-loop only) |
| 5 | 12(closed-loop only) |
| 6 | 14(closed-loop only) |
| 7 | Wideband precoding(open-loop, closed-loop) |

6. Distributed Resource Allocation

The BS may allocate a DL time-frequency resource to the UE in a distributed manner. The time-frequency resource may be an RB. Among RBs allocated to the UE, consecutive RBs are referred to as an RB group. Multiple RB groups may be allocated to the UE. The RB groups are divided in a frequency domain.

A precoding bandwidth may start from a first RB of the RB group. The precoding bandwidth may be identical to the RB group. In this case, the UE may obtain precoding bandwidth information by using a resource allocation field included in a DL grant. Accordingly, the BS may flexibly allocate an RB to the UE. In addition, an interpolation gain can be maximized.

Figure 23:
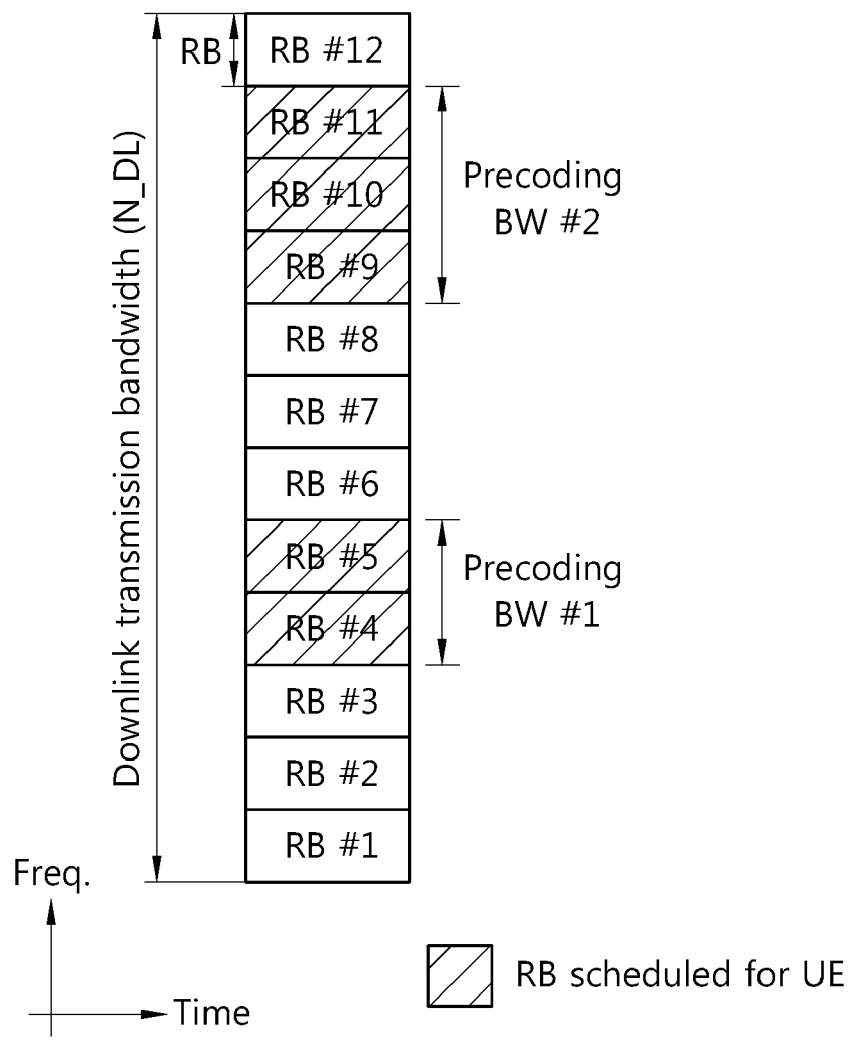
FIG. 23 shows an example of a precoding bandwidth.

FIG. 23 shows an example of a precoding bandwidth.

Referring to FIG. 23, RB #4, RB #5, RB #9, RB #10, and RB #11 are RBs scheduled for the UE. The RB #4 and the RB #5 belong to an RB group #1. The RB #9, the RB #10, and the RB #11 belong to an RB group #2. A precoding bandwidth #1 is identical to the RB group #1. Therefore, the UE can perform channel interpolation in the RB group #1. A precoding bandwidth #2 is identical to the RB group #2. Therefore, the UE can perform channel interpolation in the RB group #2.

7. Support of Rank-Specific Precoding Bandwidth

A precoding bandwidth may be supported only in a rank specific manner. For example, if a system supports up to rank-8 transmission, the precoding bandwidth may be reported only for a rank 5 or below. Accordingly, flexible scheduling is possible for a higher rank greater than or equal to a specific rank. In addition, a channel estimation gain can be provided in a lower rank less than or equal to the specific rank.

8. Support of Layer-Specific Precoding Bandwidth

If a multiple spatial stream is transmitted by using a multiple spatial layer, precoding bandwidth indication may be effective only in a specific spatial layer. One RB-based precoding bandwidth may be used in another spatial layer.

Figure 24:
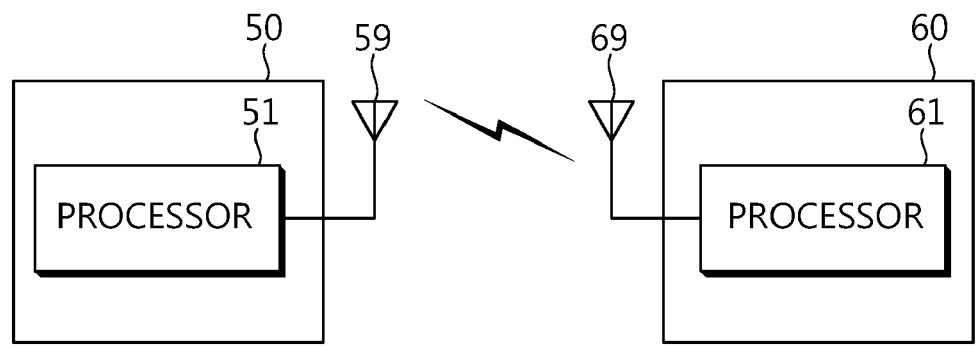
FIG. 24 is a block diagram showing an apparatus for wireless communication for implementing an embodiment of the present invention.

FIG. 24 is a block diagram showing an apparatus for wireless communication for implementing an embodiment of the present invention. A BS 50 includes a processor 51 and an antenna 59.

The processor 51 is coupled to the antenna 59, and implements the proposed functions, processes, and/or methods. Layers of a protocol stack may be implemented by the processor 51. The antenna 59 transmits or receives a signal. One or a plurality of antennas 59 may be provided. The BS 50 may further include a memory (not shown). The memory (not shown) is coupled to the processor 51, and stores a variety of information for driving the processor 51.

A UE 60 includes a processor 61 and an antenna 69. The processor 61 is coupled to the antenna 69, and implements the proposed functions, processes, and/or methods. Layers of a radio interface protocol may be implemented by the processor 61. The antenna 69 transmits or receives a signal. One or a plurality of antennas 69 may be provided. The UE 60 may further include a memory (not shown). The memory (not shown) is coupled to the processor 61, and stores a variety of information for driving the processor 61.

The processors 51 and 61 may include an application-specific integrated circuit (ASIC), a separate chipset, a logic circuit, a data processing unit, and/or a radio frequency (RF) unit for mutually converting a baseband signal and a radio signal. The proposed transmitter may be implemented in the processors 51 and 61. The memory (not shown) may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory (not shown) and may be performed by the processors 51 and 61. The memory (not shown) may be located inside or outside the processors 51 and 61, and may be coupled to the processors 51 and 61 by using various well-known means.

Accordingly, an apparatus and method for effectively transmitting a signal in a wireless communication system are provided. A UE can obtain precoding bandwidth information. The UE can perform channel estimation by using channel interpolation in a frequency region included in a precoding bandwidth on the basis of the precoding bandwidth information. In this manner, the UE can obtain better channel estimation performance. Therefore, overall system performance can be improved.

Additional advantages, objectives, and features of the present invention will become more apparent to those ordinary skilled in the art upon implementation of the present invention based on the aforementioned descriptions or explanation. Moreover, other unexpected advantages may be found as those ordinary skilled in the art implement the present invention based on the aforementioned explanations.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Thus, another step may be included therein or one or more steps may be deleted within the scope of the present invention.

Various modifications may be made in the aforementioned embodiments. Although all possible combinations of the various modifications of the embodiments cannot be described, those ordinary skilled in that art will understand possibility of other combinations. For example, those ordinary skilled in the art will be able to implement the invention by combining respective structures described in the aforementioned embodiments. Therefore, the present invention is not intended to be limited to the embodiments shown herein but is to be accorded the widest scope consistent with the principles and novel features disclosed herein.

The invention claimed is:

1. A channel estimation method in a wireless communication system, the method performed by a user equipment (UE) and comprising:
    obtaining a precoding bandwidth indicating one or more consecutive resource blocks to which a same precoding matrix is applied by a base station (BS),
    wherein a size of the one of more consecutive resource blocks indicated by the precoding bandwidth depends on an overall downlink bandwidth allocated by the wireless communication system;
    receiving, from the BS, a precoded signal via one or more consecutive resource blocks of the resource blocks; and
    decoding the received signal based on the same precoding matrix.

2. The method of claim 1, wherein the size of the one of more consecutive resource blocks indicated by the precoding bandwidth is set to a size of a feedback subband that is used for feedback of channel state information (CSI), the CSI including at least a channel quality indicator (CQI) or a rank indicator (RI).

3. The method of claim 1, wherein the precoding bandwidth is further based on a transmission scheme configured for the UE.

4. A user equipment (UE) for channel estimation in a wireless communication system, the UE comprising:
    a radio frequency unit; and
    a processor coupled to the radio frequency unit and configured to:
        obtain a precoding bandwidth indicating one or more consecutive resource blocks to which a same precoding matrix is applied by a base station (BS),
        wherein a size of the one of more consecutive resource blocks indicated by the precoding bandwidth depends on an overall downlink bandwidth allocated by the wireless communication system;
        receive a precoded signal via one or more consecutive resource blocks of the resource blocks; and
        decode the received signal based on the same precoding matrix.

5. The UE of claim 4, wherein the size of the one of more consecutive resource blocks indicated by the precoding bandwidth is set to a size of a feedback subband that is used for feedback of channel state information (CSI), the CSI including at least a channel quality indicator (CQI) or a rank indicator (RI).

6. The UE of claim 4, wherein the precoding bandwidth is further based on a transmission scheme configured for the UE.

* * * * *